United States Patent
Kasutani

(10) Patent No.: US 7,236,652 B2
(45) Date of Patent: Jun. 26, 2007

(54) IMAGE RETRIEVAL APPARATUS AND IMAGE RETRIEVING METHOD

(75) Inventor: Eiji Kasutani, Tokyo (JP)

(73) Assignee: NEC Corporation, Tokyo (JP)

( * ) Notice: Subject to any disclaimer, the term of this patent is extended or adjusted under 35 U.S.C. 154(b) by 654 days.

(21) Appl. No.: 10/202,535

(22) Filed: Jul. 24, 2002

(65) Prior Publication Data

US 2003/0021481 A1    Jan. 30, 2003

(30) Foreign Application Priority Data

Jul. 25, 2001    (JP) .............................. 2001-224547

(51) Int. Cl.
*G06K 9/54*    (2006.01)
*G06K 9/60*    (2006.01)

(52) U.S. Cl. .................................... 382/305

(58) Field of Classification Search ................. 382/305
See application file for complete search history.

(56) References Cited

U.S. PATENT DOCUMENTS 5,369,502 A * 11/1994 Fukuda et al. ......... 358/426.12
5,579,471 A * 11/1996 Barber et al. ............... 715/700
5,802,361 A *  9/1998 Wang et al. ................. 382/217
5,845,015 A * 12/1998 Martucci .................... 382/250

(Continued)

FOREIGN PATENT DOCUMENTS

JP    11-066107    3/1999

(Continued)

OTHER PUBLICATIONS

Sheikholeslami, Gholamhosein, Wendy Chang, Aidong Zhange. "Semantic Clustering and Querying on Heterogenous Features for Visual Data". 1998. ACM Press. MULTIMEDIA '98: Proceedings of the Sixth ACM International Conference of Mutimedia. pp. 3-12.*

*Primary Examiner*—Bhavesh M Mehta
*Assistant Examiner*—Damon Conover
(74) *Attorney, Agent, or Firm*—Scully, Scott, Murphy & Presser, P.C.

(57) ABSTRACT

An object of the present invention is to provide an image retrieval system for computing similarity in the case when components are different between an image feature vector of a query image and the image feature vectors of images to be retrieved when retrieval is carried out by using features of images. A first image feature vector conversion device converts a query image feature vector into a first image feature vector for use in a similarity computation according to similarity computation image feature vector configuration information describing a given configuration of an image feature vector for use in a similarity computation. A second image feature vector conversion device converts an images-to-be-retrieved feature vector into a second image feature vector for use in a similarity computation according to the similarity computation image feature vector configuration information. The image feature vector similarity computation devices compare the first image feature vector with the second image feature vector according to the similarity computation image feature vector configuration information, and compute the similarity.

75 Claims, 8 Drawing Sheets

U.S. PATENT DOCUMENTS

| | | | |
|---|---|---|---|
| 5,913,205 A * | 6/1999 | Jain et al. | 707/2 |
| 6,173,275 B1 * | 1/2001 | Caid et al. | 706/14 |
| 6,175,829 B1 * | 1/2001 | Li et al. | 707/3 |
| 6,192,150 B1 * | 2/2001 | Leow et al. | 382/190 |
| 6,243,492 B1 | 6/2001 | Kamei | |
| 6,442,538 B1 | 8/2002 | Nojima | |
| 2001/0056419 A1 | 12/2001 | Lee | |

FOREIGN PATENT DOCUMENTS

| | | |
|---|---|---|
| JP | 11-338876 | 12/1999 |
| JP | 2000-259832 | 9/2000 |
| JP | 2001-034632 | 2/2001 |
| WO | 98/50869 | 11/1998 |
| WO | 01/22270 | 3/2003 |

* cited by examiner

IMAGE RETRIEVAL APPARATUS AND IMAGE RETRIEVING METHOD

BACKGROUND OF THE INVENTION

1. Field of the Invention

The present invention relates to an image retrieval apparatus and a method for determining the similarity of each image, and retrieving an image similar to a specified image, and more specifically to an image retrieval system for computing the similarity when the configurations of the feature vector of a query image and the feature vector of an image to be compared are different from each other especially when a retrieving process is performed by using an image feature.

2. Description of the Related Art

Conventionally, an image retrieving process has been performed by converting the feature of an image into data, indicating an image feature vector, determining the similarity of each image by using the image feature vector, and retrieving a similar image (for example, from accumulated images). Various apparatuses and computer programs have been developed to perform the process.

In the above mentioned conventional technology for retrieving an image, a method of retrieving a similar image based on the similarity of an image feature vector is adopted using a feature vector extracted from an image.

FIG. 8 shows an image retrieval system using the conventional image feature vector. FIG. 8 is a block diagram showing a configuration of the conventional image retrieval system. The conventional image retrieval system comprises first image feature vector generation means 102, second image feature vector generation means 202, image feature vector similarity computation means 107, a similarity evaluation unit 109, and an output device 111 for outputting a retrieval result.

In this system, it is necessary to determine in advance what feature vector is to be extracted in what configuration to compare the image feature vector of a query image with image feature vectors of images to be retrieved. First, the first image feature vector generation means 102 generates an image feature vector 103 from a query image 101 and query image feature vector configuration information 100 describing the configuration of the image feature vector. The second image feature vector generation means 202 generates an image feature vector 203 from images 201 to be retrieved and the images-to-be-retrieved feature vector configuration information 200 describing the configuration of the images-to-be-retrieved feature vector. It further comprises the image feature vector similarity computation means 107 for computing similarity 108 between the image feature vector 103 and the image feature vector 203, a similarity evaluation unit 109 for evaluating the similarity based on the computed similarity 108 and returning a retrieval result 110, and the output device 111 for outputting the retrieval result.

On the other hand, as an example of the conventional technology, the conventional image retrieval system using the frequency distribution feature vector expressed by the color layout of an image using a frequency area as an image feature vector is disclosed in Japanese Patent Laid-Open Publication No. 2000-259832. The frequency distribution feature vector refers to an image feature vector indicating the energy of each band obtained by dividing the frequency distribution of a spectrum of the color (average color) of an image into a plurality of bands and performing a frequency analysis. The configuration information describes a band used as a frequency distribution feature vector. When the configuration of the frequency distribution feature vector of a query image is different from the configuration of the frequency distribution feature vector extracted from images to be retrieved, that is, when a query image feature vector has 18 conversion coefficients (6 coefficients of luminance and 6 coefficients of chrominance) when the images-to-be-retrieved feature vector has 12 conversion coefficients (6 coefficients of luminance and 3 coefficients of chrominance), etc., there has been no means for computing the similarity of them. Thus, to retrieve an image in an environment in which image feature vectors having plural types of configurations exist, an image feature vector database and similarity computation means are required corresponding to the configuration of the feature vector of a query image. Therefore, it is necessary to provide similarity computation means and an image feature vector database corresponding to each type of configuration of an image feature vector. Therefore, such a problem arises that the apparatus is complicated and costly for manufacturing.

On the other hand, there is a method of solving the above mentioned problem by comparing only the common coefficients and computing the similarity. In this case, the dimension of the computed similarity depends on the configuration of the coefficient of an image, the comparison cannot be performed using the same similarity. For example, if a query image has 18 coefficients, and the image feature vectors of images to be retrieved are 12 and 18 coefficients, then the similarity computed by comparing only 12 coefficients and the similarity computed by comparing 18 coefficients have different weights. Therefore, the similarity cannot be evaluated on the same basis.

As described above, there have been the following problems with the conventional apparatus.

First, there are a number of elements and configurations forming the image feature vector indicating the features of an element. To compare and retrieve images, it is necessary to prepare image feature vectors having common configurations for each of the images to be compared (retrieved).

Second, there is a method of solving the above mentioned problem by comparing common components only and computing the similarity. However, in this case, since the dimension of the computed similarity depends on each image, the comparison cannot be carried out by using the same similarity. That is, the comparison cannot be carried out on images having different coefficients and feature vectors.

SUMMARY OF THE INVENTION

A first object of the present invention is to solve the above mentioned problems of the conventional technology, and to provide an image retrieval apparatus, an image retrieving method, and an image retrieving program for realizing with a simple configuration of an apparatus the comparison and retrieval of each image in a system in which image feature vectors having various device configurations exist.

A second object of the present invention is to solve the above mentioned problems of the conventional technology, and to provide an image retrieval apparatus, an image retrieving method, and an image retrieving program for realizing the comparison and retrieval based on the same standard on the values of the similarity computed by comparing image feature vectors having various configurations.

An image retrieval apparatus according to the present invention retrieves an image similar to a predetermined query image from images to be retrieved using an image feature vector, and includes: first image feature vector conversion means for receiving similarity computation image feature vector configuration information describing the configuration of an image feature vector for use in a similarity computation, and converting the image feature vector of the query image into a first image feature vector according to the similarity computation image feature vector configuration information; and second image feature vector conversion means for converting the image feature vector of the images to be retrieved into a second image feature vector according to the similarity computation image feature vector configuration information. With the configuration, the similarity between the first image feature vector and the second image feature vector is computed according to the similarity computation image feature vector configuration information.

The apparatus can also be configured by first configuration information prospect selection means for referring to query image feature vector configuration information describing the configuration of an image feature vector of the query image, and outputting a configuration information list of possible feature vector configurations of the image feature vector of the query image; second configuration information prospect selection means for referring to images-to-be-retrieved feature vector configuration information describing the configuration of an image feature vector of the image to be retrieved, and outputting a configuration information list of possible feature vector configurations of the image feature vectors of the images to be retrieved; configuration information discrimination means for receiving similarity computation image feature vector configuration information describing the configuration of an image feature vector for use in a similarity computation, and determining whether or not the similarity computation image feature vector configuration information is contained in both configuration information list obtained from the first configuration information prospect selection means and configuration information list obtained from the second configuration information prospect selection means; first image feature vector conversion means for converting the image feature vector of the query image into a first image feature vector for use in the similarity computation according to the similarity computation image feature vector configuration information when the configuration information discrimination means determines that the information is contained in both lists; and second image feature vector conversion means for converting the image feature vectors of the images to be retrieved into a second image feature vector for use in the similarity computation according to the similarity computation image feature vector configuration information when the configuration information discrimination means determines that the information is contained in both lists. With the configuration, the similarity between the first image feature vector and the second image feature vector is computed according to the similarity computation image feature vector configuration information.

The apparatus can also be configured by: determination means for determining, according to similarity computation image feature vector configuration information given as input or similarity computation image feature vector configuration information generated by configuration information reselection means, whether or not both of image feature vector of the query image and image feature vectors of the images to be retrieved can be converted; configuration information reselection means for selecting similarity computation image feature vector configuration information again when the determination means determines that the image feature vectors cannot be converted; first image feature vector conversion means for converting the image feature vector of the query image into a first image feature vector for use in a similarity computation according to the similarity computation image feature vector configuration information when the determination means determines that the image feature vectors can be converted; and second image feature vector conversion means for converting the image feature vectors of the images to be retrieved into a second image feature vector for use in the similarity computation according to the similarity computation image feature vector configuration information when the determination means determines that the image feature vectors can be converted. With the configuration, the similarity between the first image feature vector and the second image feature vector is computed according to the similarity computation image feature vector configuration information.

The apparatus can also be configured by: configuration information generation means for generating similarity computation image feature vector configuration information describing the configuration of an image feature vector for use in a similarity computation; first image feature vector conversion means for converting the image feature vector of the query image into a first image feature vector for use in a similarity computation according to the similarity computation image feature vector configuration information; and second image feature vector conversion means for converting the image feature vectors of the images to be retrieved into a second image feature vector for use in a similarity computation according to the similarity computation image feature vector configuration information. With the configuration, the similarity between the first image feature vector and the second image feature vector is computed according to the similarity computation image feature vector configuration information.

The apparatus can also be configured by: first configuration information prospect selection means for referring to query image feature vector configuration information describing the configuration of an image feature vector of the query image, and outputting a configuration information list of possible feature vector configurations of the image feature vector of the query image; second configuration information prospect selection means for referring to images-to-be-retrieved feature vector configuration information describing the configuration of an image feature vector of the image to be retrieved, and outputting a configuration information list of possible feature vector configurations of the image feature vectors of the images to be retrieved; configuration information determination means for referring to the configuration information list obtained by the first configuration information prospect selection means and the configuration information list obtained by the second configuration information prospect selection means, and determining similarity computation image feature vector configuration information describing the configuration of an image feature vector for use in a similarity computation; first image feature vector conversion means for converting the image feature vector of the query image into a first image feature vector for use in the similarity computation according to the similarity computation image feature vector configuration information; and second image feature vector conversion means for converting the image feature vectors of the images to be retrieved into a second image feature vector for use in the similarity computation according to the similarity computation image feature vector configuration information. With the configuration, the similarity between the first image feature vector and the second image feature vector is computed according to the similarity computation image feature vector configuration information.

The apparatus can also be configured by: configuration information generation means for generating similarity computation image feature vector configuration information describing the configuration of an image feature vector for use in a similarity computation; determination means for determining according to similarity computation image feature vector configuration information generated by the configuration information generation means or configuration information reselection means as to whether or not both of image feature vector of the query image and image feature vectors of the images to be retrieved can be converted; configuration information reselection means for selecting similarity computation image feature vector configuration information again when the determination means determines that the image feature vectors cannot be converted; first image feature vector conversion means for converting the image feature vector of the query image into a first image feature vector for use in a similarity computation according to the similarity computation image feature vector configuration information when the determination means determines that the image feature vectors can be converted; and second image feature vector conversion means for converting the image feature vectors of the images to be retrieved into a second image feature vector for use in the similarity computation according to the similarity computation image feature vector configuration information when the determination means determines that the image feature vectors can be converted. With the configuration, the similarity between the first image feature vector and the second image feature vector is computed according to the similarity computation image feature vector configuration information.

The configuration information generation means can refer to query image feature vector configuration information describing the configuration of the image feature vector of the query image and images-to-be-retrieved feature vector configuration information describing the configuration of the image feature vectors of the images to be retrieved, and can generate similarity computation image feature vector configuration information.

When the similarity between the first image feature vector and the second image feature vector is computed, normalized similarity can be computed depending on contents of the similarity computation image feature vector configuration information.

The image feature vector can be generated by obtaining a reduced image from an image of which a feature vector is to be extracted, and performing discrete cosine transform and quantization on the reduced image.

The similarity computation image feature vector configuration information can relate to the configuration of discrete cosine transform coefficients forming an image feature vector.

The image feature vector can be one or more dominant colors of an image, and the similarity computation image feature vector configuration information relates to the dominant color(s).

The image feature vector can indicate a direction of an edge of an image, and the similarity computation image feature vector configuration information can relate to a type of direction of the edge.

The image feature vector can indicate a texture of an image, and the similarity computation image feature vector configuration information can relate to a type of texture.

The image feature vector can indicate a shape of an image, and the similarity computation image feature vector configuration information can relate to a type of shape.

The image feature vector can indicate a motion of an image, and the similarity computation image feature vector configuration information can relate to a type of motion.

The image feature vector can be generated by extracting a feature vector of each rectangular area after dividing an image into rectangular areas, and the similarity computation image feature vector configuration information can relate to a rectangular area.

An image retrieving method according to the present invention retrieves an image similar to a predetermined query image from images to be retrieved using an image feature vector, and includes: a first image feature vector conversion step of receiving similarity computation image feature vector configuration information describing the configuration of an image feature vector for use in a similarity computation, and converting the image feature vector of the query image into a first image feature vector according to the similarity computation image feature vector configuration information; a second image feature vector conversion step of converting the image feature vector of the images to be retrieved into a second image feature vector according to the similarity computation image feature vector configuration information; and a step of computing the similarity between the first image feature vector and the second image feature vector according to the similarity computation image feature vector configuration information.

The method can also be configured by: a first configuration information prospect selection step of referring to query image feature vector configuration information describing the configuration of an image feature vector of the query image, and outputting a configuration information list of possible feature vector configurations of the image feature vector of the query image; a second configuration information prospect selection step of referring to images-to-be-retrieved feature vector configuration information describing the configuration of an image feature vector of the image to be retrieved, and outputting a configuration information list of possible feature vector configurations of the image feature vectors of the images to be retrieved; a configuration information discrimination step of receiving similarity computation image feature vector configuration information describing the configuration of an image feature vector for use in a similarity computation, and determining whether or not the similarity computation image feature vector configuration information is contained in both configuration information list obtained in the first configuration information prospect selection step and a configuration information list obtained in the second configuration information prospect selection step; a first image feature vector conversion step of converting the image feature vector of the query image into a first image feature vector for use in the similarity computation according to the similarity computation image feature vector configuration information when the configuration information discrimination step determines that the information is contained in both lists; a second image feature vector conversion step of converting the image feature vectors of the images to be retrieved into a second image feature vector for use in the similarity computation according to the similarity computation image feature vector configuration information when the configuration information discrimination step determines that the information is contained in both lists; and a step of computing the similarity between the first image feature vector and the second image feature vector according to the similarity computation image feature vector configuration information.

The method can also be configured by: a determination step of determining according to similarity computation image feature vector configuration information given as input or similarity computation image feature vector configuration information generated in a configuration information reselection step as to whether or not both of image feature vector of the query image and image feature vectors of the images to be retrieved can be converted; a configuration information reselection step of selecting similarity computation image feature vector configuration information again when the determination step determines that the image feature vectors cannot be converted; a first image feature vector conversion step of converting the image feature vector of the query image into a first image feature vector for use in a similarity computation according to the similarity computation image feature vector configuration information when the determination step determines that the image feature vectors can be converted; a second image feature vector conversion step of converting the image feature vectors of the images to be retrieved into a second image feature vector for use in the similarity computation according to the similarity computation image feature vector configuration information when the determination step determines that the image feature vectors can be converted; and a step of computing the similarity between the first image feature vector and the second image feature vector according to the similarity computation image feature vector configuration information.

The method can also be configured by: a configuration information generation step of generating similarity computation image feature vector configuration information describing the configuration of an image feature vector for use in a similarity computation; a first image feature vector conversion step of converting the image feature vector of the query image into a first image feature vector for use in a similarity computation according to the similarity computation image feature vector configuration information; a second image feature vector conversion step of converting the image feature vectors of the images to be retrieved into a second image feature vector for use in a similarity computation according to the similarity computation image feature vector configuration information; and a step of computing the similarity between the first image feature vector and the second image feature vector according to the similarity computation image feature vector configuration information.

The method can also be configured by: a first configuration information prospect selection step of referring to query image feature vector configuration information describing the configuration of an image feature vector of the query image, and outputting a configuration information list of possible feature vector configurations of the image feature vector of the query image; a second configuration information prospect selection step of referring to images-to-be-retrieved feature vector configuration information describing the configuration of an image feature vector of the image to be retrieved, and outputting a configuration information list of possible feature vector configurations of the image feature vectors of the images to be retrieved; a configuration information determination step of referring to the configuration information list obtained in the first configuration information prospect selection step and the configuration information list obtained in the second configuration information prospect selection step, and determining similarity computation image feature vector configuration information describing the configuration of an image feature vector for use in a similarity computation; a first image feature vector conversion step of converting the image feature vector of the query image into a first image feature vector for use in the similarity computation according to the similarity computation image feature vector configuration information; a second image feature vector conversion step of converting the image feature vectors of the images to be retrieved into a second image feature vector for use in the similarity computation according to the similarity computation image feature vector configuration information; and a step of computing the similarity between the first image feature vector and the second image feature vector according to the similarity computation image feature vector configuration information.

The method can also be configured by: a configuration information generation step of generating similarity computation image feature vector configuration information describing the configuration of an image feature vector for use in a similarity computation; a determination step of determining according to similarity computation image feature vector configuration information generated in the configuration information generation step or configuration information reselection step as to whether or not both of image feature vector of the query image and image feature vectors of the images to be retrieved can be converted; a configuration information reselection step of selecting similarity computation image feature vector configuration information again when the determination step determines that the image feature vectors cannot be converted; a first image feature vector conversion step of converting the image feature vector of the query image into a first image feature vector for use in a similarity computation according to the similarity computation image feature vector configuration information when the determination step determines that the image feature vectors can be converted; a second image feature vector conversion step of converting the image feature vectors of the images to be retrieved into a second image feature vector for use in the similarity computation according to the similarity computation image feature vector configuration information when the determination step determines that the image feature vectors can be converted; and a step of computing the similarity between the first image feature vector and the second image feature vector according to the similarity computation image feature vector configuration information.

The configuration information generation step can refer to query image feature vector configuration information describing the configuration of the image feature vector of the query image and images-to-be-retrieved feature vector configuration information describing the configuration of the image feature vectors of the images to be retrieved, and can generate similarity computation image feature vector configuration information.

An image retrieving program according to the present invention directs a computer to perform an image retrieving process of retrieving an image similar to a predetermined query image from images to be retrieved using an image feature vector, and includes: a first image feature vector conversion process of receiving similarity computation image feature vector configuration information describing the configuration of an image feature vector for use in a similarity computation, and converting the image feature vector of the query image into a first image feature vector according to the similarity computation image feature vector configuration information; a second image feature vector conversion process of converting the image feature vector of the images to be retrieved into a second image feature vector according to the similarity computation image feature vector configuration information; and a process of computing the similarity between the first image feature vector and the second image feature vector according to the similarity computation image feature vector configuration information.

The program can also be configured to direct a computer to perform: a first configuration information prospect selection process of referring to query image feature vector configuration information describing the configuration of an image feature vector of the query image, and outputting a configuration information list of possible feature vector configurations of the image feature vector of the query image; a second configuration information prospect selection process of referring to images-to-be-retrieved feature vector configuration information describing the configuration of an image feature vector of the image to be retrieved, and outputting a configuration information list of possible feature vector configurations of the image feature vectors of the images to be retrieved; a configuration information discrimination process of receiving similarity computation image feature vector configuration information describing the configuration of an image feature vector for use in a similarity computation, and determining whether or not the similarity computation image feature vector configuration information is contained in both configuration information list obtained in the first configuration information prospect selection process and a configuration information list obtained in the second configuration information prospect selection process; a first image feature vector conversion process of converting the image feature vector of the query image into a first image feature vector for use in the similarity computation according to the similarity computation image feature vector configuration information when the configuration information discrimination process determines that the information is contained in both lists; a second image feature vector conversion process of converting the image feature vectors of the images to be retrieved into a second image feature vector for use in the similarity computation according to the similarity computation image feature vector configuration information when the configuration information discrimination process determines that the information is contained in both lists; and a process of computing the similarity between the first image feature vector and the second image feature vector according to the similarity computation image feature vector configuration information.

The program can also be configured to direct a computer to perform: a determination process of determining according to similarity computation image feature vector configuration information given as input or similarity computation image feature vector configuration information generated in a configuration information reselection process as to whether or not both of image feature vector of the query image and image feature vectors of the images to be retrieved can be converted; a configuration information reselection process of selecting similarity computation image feature vector configuration information again when the determination process determines that the image feature vectors cannot be converted; a first image feature vector conversion process of converting the image feature vector of the query image into a first image feature vector for use in a similarity computation according to the similarity computation image feature vector configuration information when the determination process determines that the image feature vectors can be converted; a second image feature vector conversion process of converting the image feature vectors of the images to be retrieved into a second image feature vector for use in the similarity computation according to the similarity computation image feature vector configuration information when the determination process determines that the image feature vectors can be converted; and a process of computing the similarity between the first image feature vector and the second image feature vector according to the similarity computation image feature vector configuration information.

The program can also be configured to direct a computer to perform: a configuration information generation process of generating similarity computation image feature vector configuration information describing the configuration of an image feature vector for use in a similarity computation; a first image feature vector conversion process of converting the image feature vector of the query image into a first image feature vector for use in a similarity computation according to the similarity computation image feature vector configuration information; a second image feature vector conversion process of converting the image feature vectors of the images to be retrieved into a second image feature vector for use in a similarity computation according to the similarity computation image feature vector configuration information; and a process of computing the similarity between the first image feature vector and the second image feature vector according to the similarity computation image feature vector configuration information.

The program can also be configured to direct a computer to perform: a first configuration information prospect selection process of referring to query image feature vector configuration information describing the configuration of an image feature vector of the query image, and outputting a configuration information list of possible feature vector configurations of the image feature vector of the query image; a second configuration information prospect selection process of referring to images-to-be-retrieved feature vector configuration information describing the configuration of an image feature vector of the image to be retrieved, and outputting a configuration information list of possible feature vector configurations of the image feature vectors of the images to be retrieved; a configuration information determination process of referring to the configuration information list obtained in the first configuration information prospect selection process and the configuration information list obtained in the second configuration information prospect selection process, and determining similarity computation image feature vector configuration information describing the configuration of an image feature vector for use in a similarity computation; a first image feature vector conversion process of converting the image feature vector of the query image into a first image feature vector for use in the similarity computation according to the similarity computation image feature vector configuration information; a second image feature vector conversion process of converting the image feature vectors of the images to be retrieved into a second image feature vector for use in the similarity computation according to the similarity computation image feature vector configuration information; and a process of computing the similarity between the first image feature vector and the second image feature vector according to the similarity computation image feature vector configuration information.

The program can also be configured to direct a computer to perform: a configuration information generation process of generating similarity computation image feature vector configuration information describing the configuration of an image feature vector for use in a similarity computation; a determination process of determining according to similarity computation image feature vector configuration information generated in the configuration information generation process or configuration information reselection process as to whether or not both of image feature vector of the query image and image feature vectors of the images to be retrieved can be converted; a configuration information reselection process of selecting similarity computation image feature vector configuration information again when the determination process determines that the image feature vectors cannot be converted; a first image feature vector conversion process of converting the image feature vector of the query image into a first image feature vector for use in a similarity computation according to the similarity computation image feature vector configuration information when the determination process determines that the image feature vectors can be converted; a second image feature vector conversion process of converting the image feature vectors of the images to be retrieved into a second image feature vector for use in the similarity computation according to the similarity computation image feature vector configuration information when the determination process determines that the image feature vectors can be converted; and a process of computing the similarity between the first image feature vector and the second image feature vector according to the similarity computation image feature vector configuration information.

The configuration information generation process can refer to query image feature vector configuration information describing the configuration of the image feature vector of the query image and images-to-be-retrieved feature vector configuration information describing the configuration of the image feature vectors of the images to be retrieved, and can generate similarity computation image feature vector configuration information.

With the above mentioned configuration, the configuration information about the image feature vector for use in a similarity computation is determined based on the components of the configuration information configuring the image feature vector used in the similarity computation using the image feature vectors of images to be retrieved and the image feature vector of an input query image. According to the determined configuration information, the image feature vectors of the images to be retrieved are compared with the image feature vector of the query image, and the similarity between them is computed, thereby attaining the first object of the present invention.

Furthermore, the second object of the present invention can be attained by normalizing the similarity of the image feature vector depending on the contents of the configuration information.

DETAILED DESCRIPTION OF THE PREFERRED EMBODIMENTS

The aspects of the present invention will be described below in detail by referring to the attached drawings.

(First Aspect of the Present Invention)

Figure 1:
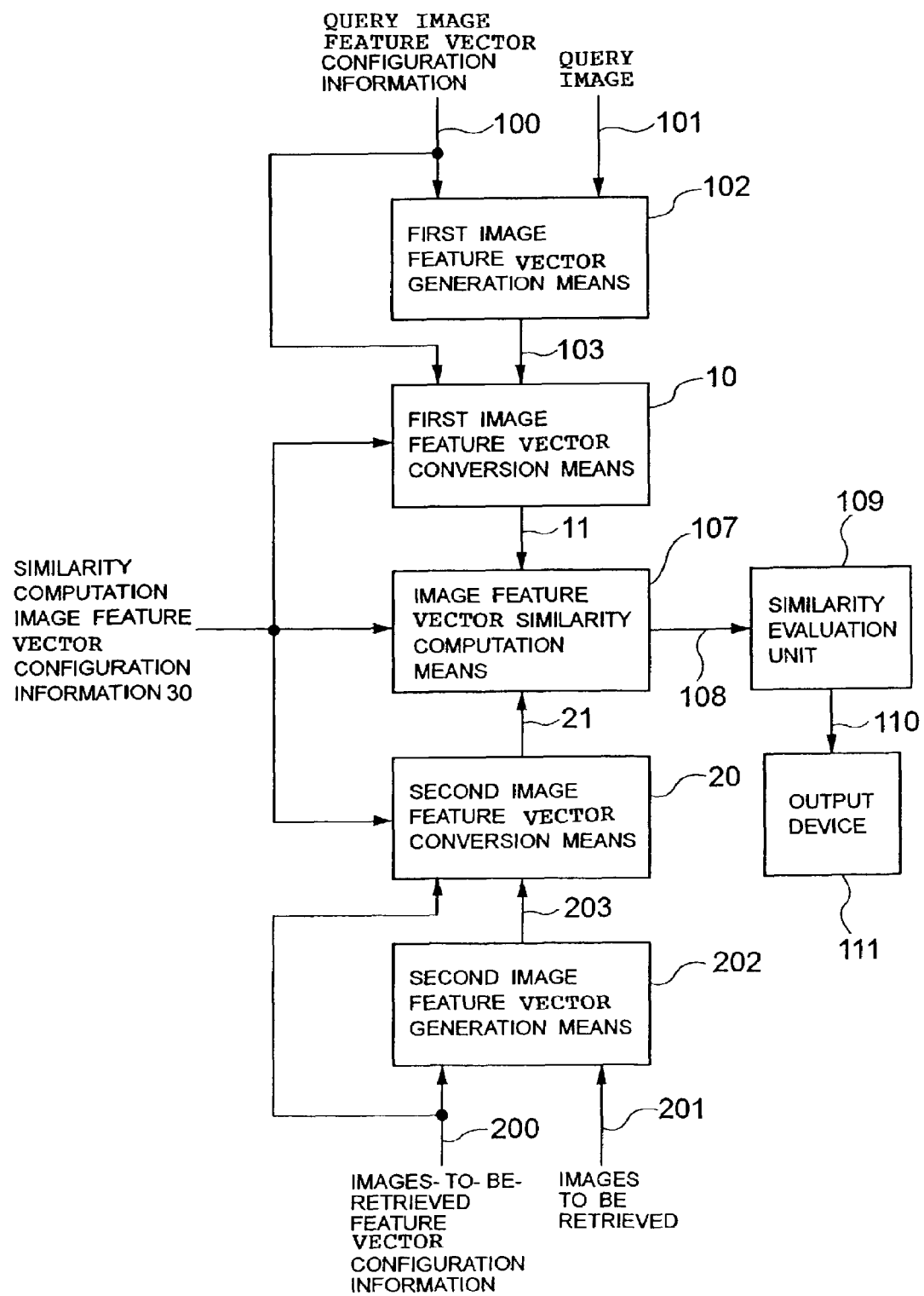
FIG. 1 is a block diagram of a configuration of an image retrieval system according to a first aspect of the present invention.

In FIG. 1, the first aspect of the present invention comprises first image feature vector generation means 102, first image feature vector conversion means 10, second image feature vector generation means 202, second image feature vector conversion means 20, image feature vector similarity computation means 107, and a similarity evaluation unit 109.

The first image feature vector generation means 102 generates the query image feature vector 103 from the query image 101 according to query image feature vector configuration information 100 describing the configuration of a query image feature vector.

Figure 2:
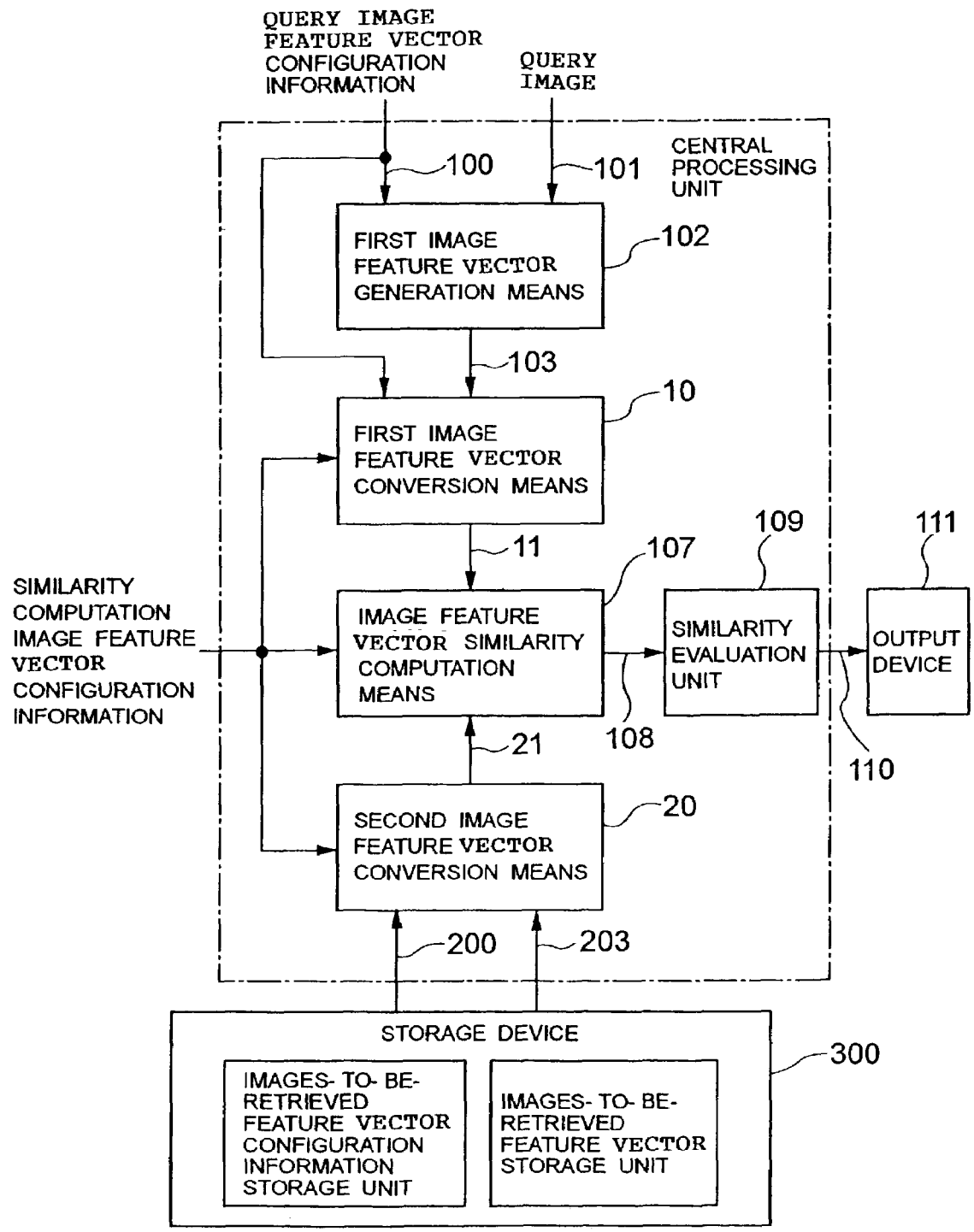
FIG. 2 is a block diagram of the configuration of the image retrieval system using a storage device according to the first aspect of the present invention.

The second image feature vector generation means 202 generates the image-to-be-retrieved feature vector 203 from the images 201 to be retrieved according to the images-to-be-retrieved feature vector configuration information 200 describing the configuration of images-to-be-retrieved feature vector. The images to be retrieved can be generated and a storage device such as a database is prepared in advance so that an image feature vector and configuration information can be stored. Additionally, as shown in FIG. 2, instead of extracting an image feature vector from a query image, the image feature vector stored in the database (storage device 300) can be used as a query image feature vector.

The first image feature vector conversion means 10 converts the query image feature vector 103 into a first image feature vector 11 for use in a similarity computation according to similarity computation image feature vector configuration information 30 describing the configuration of an image feature vector for use in a given similarity computation. In the first image feature vector conversion means 10, when the query image feature vector configuration information 100 about the image feature vector of a query image is not contained in the given similarity computation image feature vector configuration information 30, an appropriate element can be interpolated into the image feature vector 103. A method of interpolating an element can be: interpolating a fixed value; estimating and interpolating an appropriate value from the configuration information to be interpolated; estimating and interpolating an appropriate value from the configuration information to be compared, etc. The similarity computation image feature vector configuration information 30 can be provided as a piece of configuration information, provided as a set of plural pieces of configuration information, or serially provided from plural pieces of configuration information. Furthermore, the similarity computation image feature vector configuration information 30 can be externally provided or given as an internal parameter.

The second image feature vector conversion means 20 converts the image-to-be-retrieved feature vector 203 into the second image feature vector 21 for use in a similarity computation according to the similarity computation image feature vector configuration information 30. When the images-to-be-retrieved feature vector configuration information 200 is not contained in the given similarity computation image feature vector configuration information 30, the second image feature vector conversion means 20 can interpolate an appropriate element in to the image-to-be-retrieved feature vector 203. As a method of interpolating the element, a similar example to the first image feature vector conversion means 10 may be considered.

The image feature vector similarity computation means 107 compares the first image feature vector 11 with a second image feature vector 21 according to the similarity computation image feature vector configuration information 30, and computes the similarity. When different pieces of similarity computation image feature vector configuration information 30 are applied to a plurality of images, in case where the first image feature vector 11 is compared with the second image feature vector 21 for a similarity computation, normalization is performed depending on the contents of the similarity computation image feature vector configuration information 30. An example of a normalizing method can be normalization performed by dividing similarity by the number of elements, an addition with a weight individually for each element, grouping elements and weighting for each group, etc.

The similarity evaluation unit 109 selects an image feature vector similar to the query image from among the images to be retrieved according to the computed similarity 108, that is, the image feature vector closest to the first image feature vector 11, and an image corresponding to the second image feature vector 21 of the images to be retrieved is detected as an image similar to the query image.

According to the present aspect of the invention, the feature vectors of the images to be retrieved and the feature vector of the query image are converted and compared according to the given similarity computation image feature vector configuration information 30, and the similarity of them is computed. Therefore, images can be compared and retrieved without preparing image feature vectors having common configurations in a system in which image feature vectors having various coefficient configurations coexist. Thus, images can be retrieved in a simple device configuration. Furthermore, the similarity of image feature vectors is normalized based on the contents of the configuration information, thereby realizing the retrieval by comparing the similarity value obtained by comparison among image feature vectors having various configurations based on the same standard.

(Second Aspect According to the Present Invention)

The second aspect of the present invention will be described in detail by referring to the attached drawings.

Figure 3:
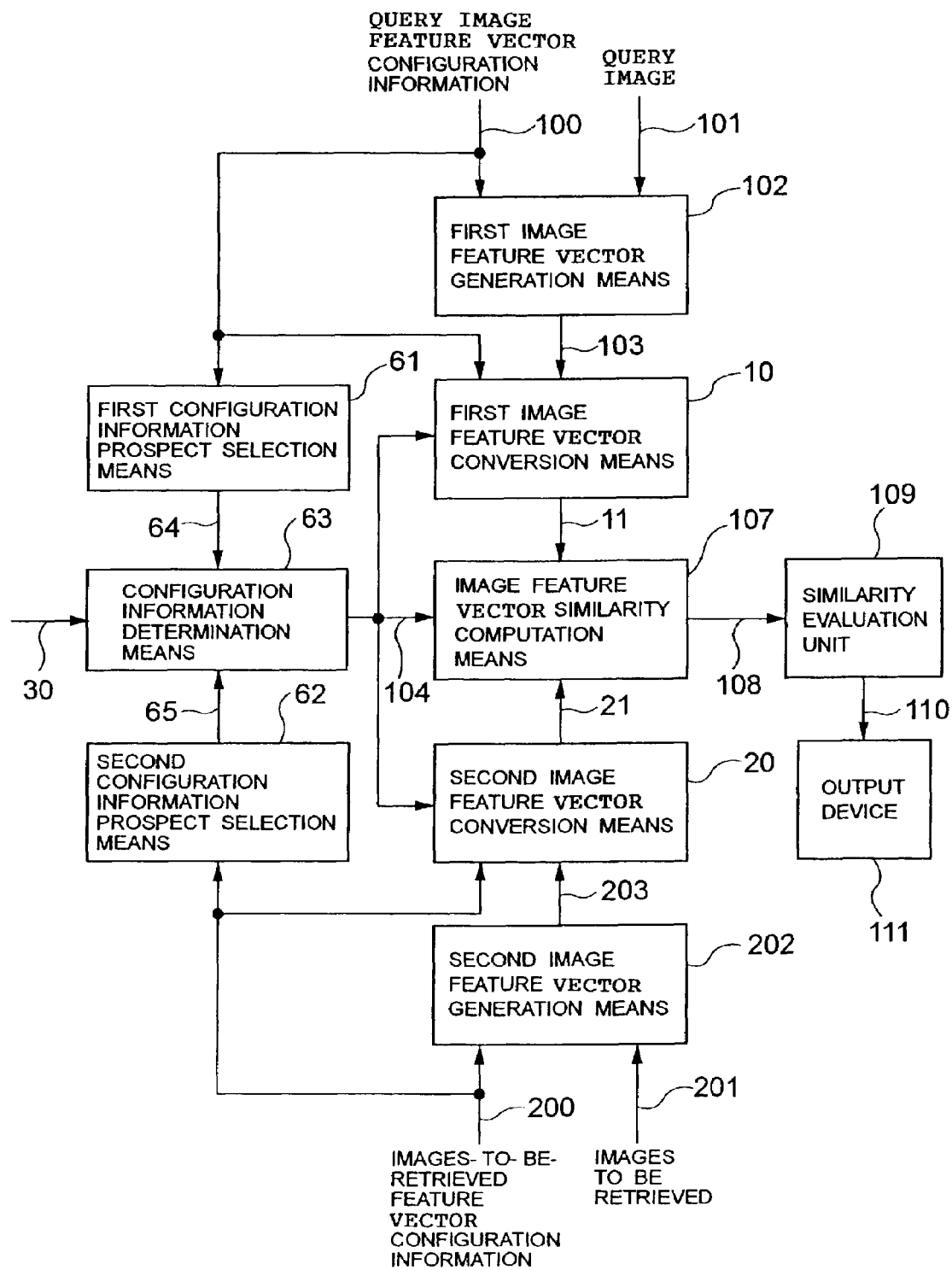
FIG. 3 is a block diagram of the configuration of the image retrieval system according to a second aspect of the present invention.

By referring to FIG. 3, the second aspect of the present invention further comprises first configuration information prospect selection means 61, second configuration information prospect selection means 62, and configuration information discrimination means 63 in addition to the configuration according to the first aspect shown in FIG. 1.

The first configuration information prospect selection means 61 refers to the query image feature vector configuration information 100 and outputs a list of possible feature vector configurations of the images-to-be-retrieved feature vector as a configuration information list 64. The second configuration information prospect selection means 62 refers to the images-to-be-retrieved feature vector configuration information 200, and outputs a list of possible feature vector configurations of images-to-be-retrieved feature vectors as a configuration information list 65.

The configuration information discrimination means 63 determines whether or not the given similarity computation image feature vector configuration information 30 is contained in both configuration information list 64 obtained by the first configuration information prospect selection means and configuration information list 65 obtained by the second configuration information prospect selection means. When it is contained, the given similarity computation image feature vector configuration information 30 is output as a similarity computation image feature vector 104.

According to the present aspect of the invention, the feature vectors of the images to be retrieved and the feature vector of the query image are converted and compared according to the given similarity computation image feature vector configuration information 30, and the similarity of them is computed. Therefore, images can be compared and retrieved without preparing image feature vectors having common configurations, in a system in which image feature vectors having various coefficient configurations coexist. Thus, images can be retrieved in a simple device configuration.

Furthermore, the similarity of image feature vectors is normalized based on the contents of the configuration information, thereby realizing the retrieval by comparing the similarity value obtained by comparison among image feature vectors having various configurations based on the same standard.

(Third Aspect According to the Present Invention)

The third aspect of the present invention will be described in detail by referring to the attached drawings.

Figure 4:
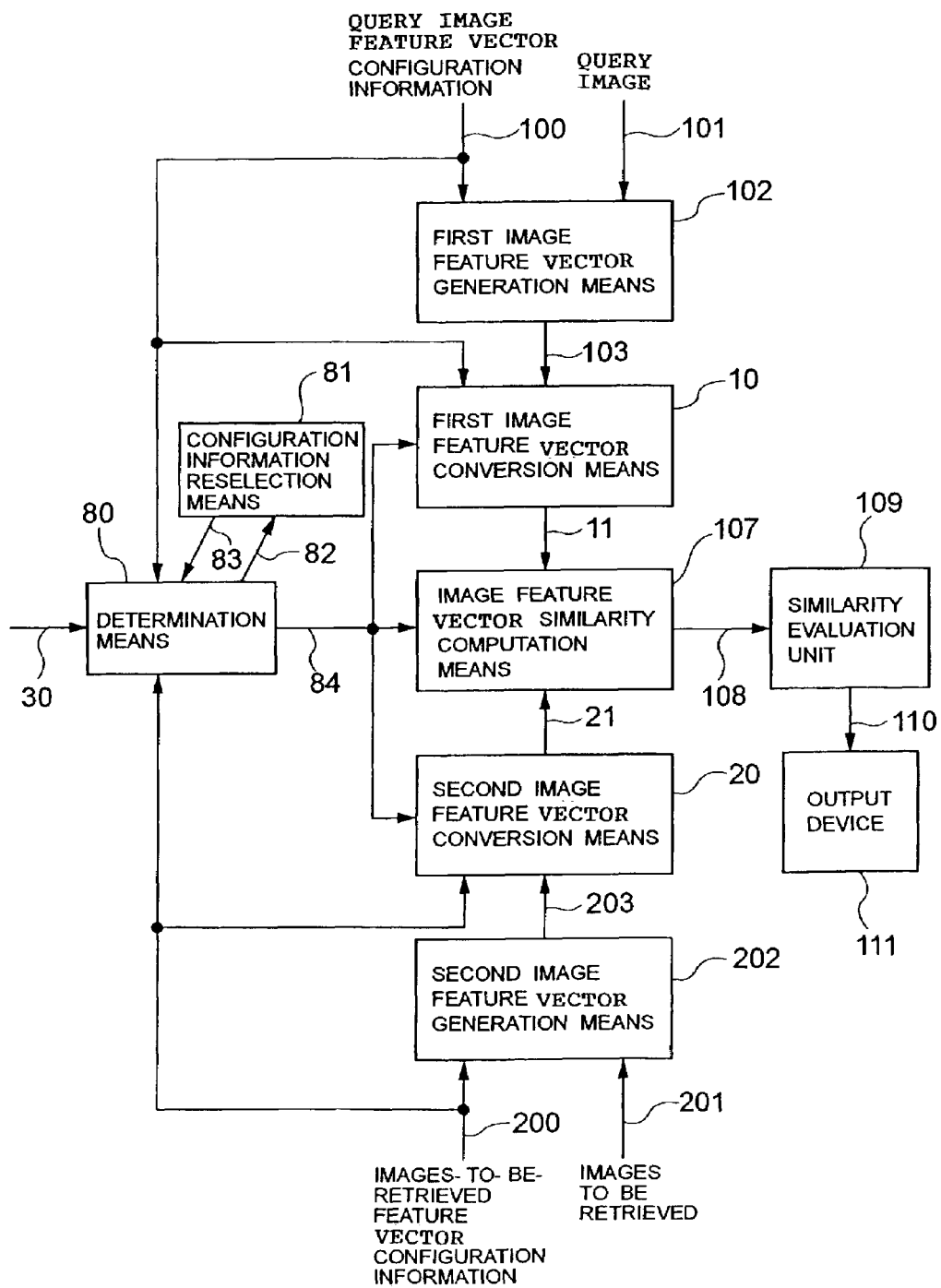
FIG. 4 is a block diagram of the configuration of the image retrieval system according to a third aspect of the present invention.

By referring to FIG. 4, the third aspect of the present invention further comprises determination means 80 and configuration information reselection means 81 in addition to the configuration according to the first aspect shown in FIG. 1.

The determination means 80 determines whether or not both query image feature vector and images-to-be-retrieved feature vector can be converted according to the given similarity computation image feature vector configuration information 30 or the similarity computation image feature vector configuration information 83 generated by the configuration information reselection means 81. The configuration information reselection means 81 selects again the similarity computation image feature vector configuration information 83 when the determination means 80 determines that the conversion cannot be performed. When the similarity computation image feature vector configuration information is selected again, it is desired that the configuration information once determined to be impossible is not output again. The process can be broken off depending on the number of times the configuration information is repeatedly selected. Furthermore, the process can also be broken off when it is determined that conversion cannot be performed on all possible configuration information. When the process is broken off, the worst value of similarity can be output.

When the determination means 80 determines that conversion can be performed, then generated similarity computation image feature vector configuration information 84 is output by the determination means 80.

The first image feature vector conversion means 10 converts the query image feature vector 103 into the first image feature vector 11 for use in a similarity computation according to the similarity computation image feature vector configuration information 84. The second image feature vector conversion means 20 converts the image-to-be-retrieved feature vector 203 into the second image feature vector 21 for use in a similarity computation according to the similarity computation image feature vector configuration information 84.

According to the present aspect of the invention, the feature vectors of the images to be retrieved and the feature vector of the query image are converted and compared according to the given similarity computation image feature vector configuration information, and the similarity of them is computed. Therefore, images can be compared and retrieved without preparing image feature vectors having common configurations, in a system in which image feature vectors having various coefficient configurations coexist. Thus, images can be retrieved in a simple device configuration.

Furthermore, the similarity of image feature vectors is normalized based on the contents of the configuration information, thereby realizing the retrieval by comparing the similarity value obtained by comparison among image feature vectors having various configurations based on the same standard.

(Fourth Aspect of the Present Invention)

The fourth aspect of the present invention will be described below in detail by referring to the attached drawings.

Figure 5:
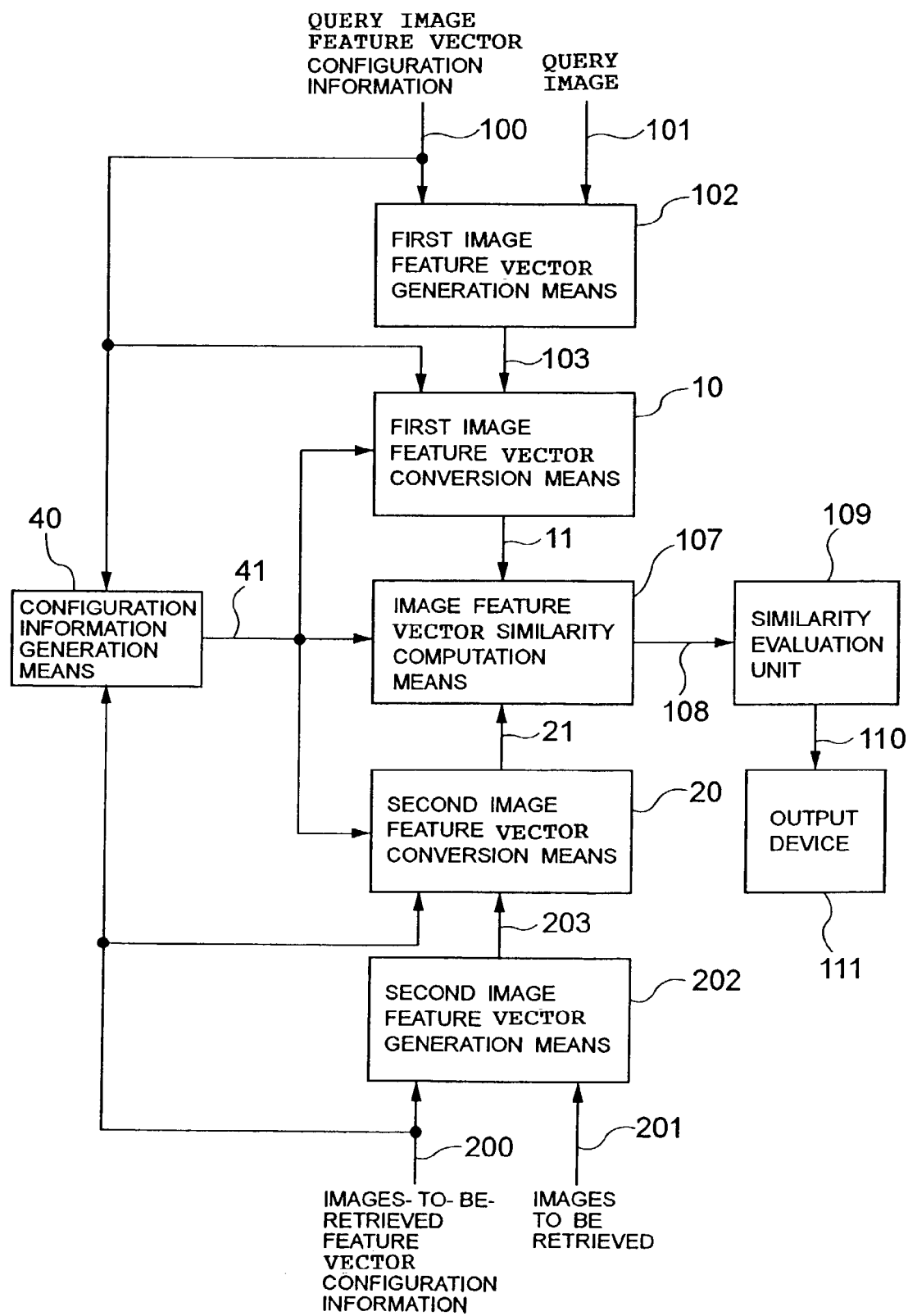
FIG. 5 is a block diagram of the configuration of the image retrieval system according to a fourth aspect of the present invention.

In FIG. 5, the fourth aspect of the present invention further comprises configuration information generation means 40 in addition to the configuration according to the first aspect shown in FIG. 1.

The first image feature vector generation means 102 generates the query image feature vector 103 from the query image 101 according to the query image feature vector configuration information 100 describing the configuration of a query image feature vector.

The second image feature vector generation means 202 generates the image-to-be-retrieved feature vector 203 from the images to be retrieved 201 according to the images-to-be-retrieved feature vector configuration information 200 describing the configuration of images-to-be-retrieved feature vector. The images to be retrieved can be generated in advance, and an image feature vector and configuration information can be stored in a database. Additionally, instead of extracting an image feature vector from a query image, the image feature vector stored in the database can be used as a query image feature vector.

The configuration information generation means 40 refers to the query image feature vector configuration information 100 and the images-to-be-retrieved feature vector configuration information 200, determines the configuration information for use in computing the similarity between image feature vectors, and outputs it as similarity computation image feature vector configuration information 41. A method of determining the configuration information for use in computing the similarity between the image feature vectors can be: adopting the configuration of the feature vector of a query image or images to be retrieved; using only a common portion of the components contained in the feature vector of a query image or images to be retrieved; using all existing portions of the components of the feature vectors of one of the query image and the images to be retrieved; interpolating a constant value; retrieving only the optimum common component for use in a similarity computation, selecting an element from among the common configuration information depending on a desired processing time, etc.

The first image feature vector conversion means 10 converts the query image feature vector 103 into the first image feature vector 11 for use in a similarity computation according to the similarity computation image feature vector configuration information 41. If the query image feature vector configuration information 100 is not contained in the given similarity computation image feature vector configuration information 30, then the first image feature vector conversion means 10 can interpolate an appropriate coefficient into the query image feature vector 103. A method of interpolating a coefficient can be: interpolating a fixed value; estimating and interpolating an appropriate value from the coefficient information to be interpolated; estimating and interpolating an appropriate value from the coefficient information to be compared, etc.

The second image feature vector conversion means 20 converts the image-to-be-retrieved feature vector 203 into the second image feature vector 21 for use in a similarity computation according to the similarity computation image feature vector configuration information 41.

When the images-to-be-retrieved feature vector configuration information 200 is not contained in the configuration information generation means 41, the second image feature vector conversion means 20 can interpolate an appropriate coefficient into the image-to-be-retrieved feature vector 203. A method of interpolating a coefficient can be: interpolating a fixed value; estimating and interpolating an appropriate value from the coefficient information to be interpolated; estimating and interpolating an appropriate value from the coefficient information to be compared, etc.

The image feature vector similarity computation means 107 compares the first image feature vector 11 with the second image feature vector 21 according to the similarity computation image feature vector configuration information 30, and computes the similarity. The similarity evaluation unit 109 selects an image feature vector having higher similarity between images to be retrieved according to the computed similarity 108, that is, the closest to the first image feature vector 11, and detects the image corresponding to the second image feature vector 21 of the images to be retrieved as an image similar to the query image.

According to the present aspect of the invention, the feature vectors of the images to be retrieved and the feature vector of the query image are converted and compared according to the common similarity computation image feature vector configuration information, and the similarity of them is computed. Therefore, images can be compared and retrieved without preparing any image feature vectors having common configurations, in a system in which image feature vectors having various coefficient configurations coexist. Thus, images can be retrieved in a simple device configuration.

Furthermore, the similarity of image feature vectors is normalized based on the contents of the configuration information, thereby realizing the retrieval by comparing the similarity value obtained by comparison among image feature vectors having various configurations based on the same standard.

(Fifth Aspect of the Present Invention)

The fifth aspect of the present invention will be described below in detail by referring to the attached drawings.

Figure 6:
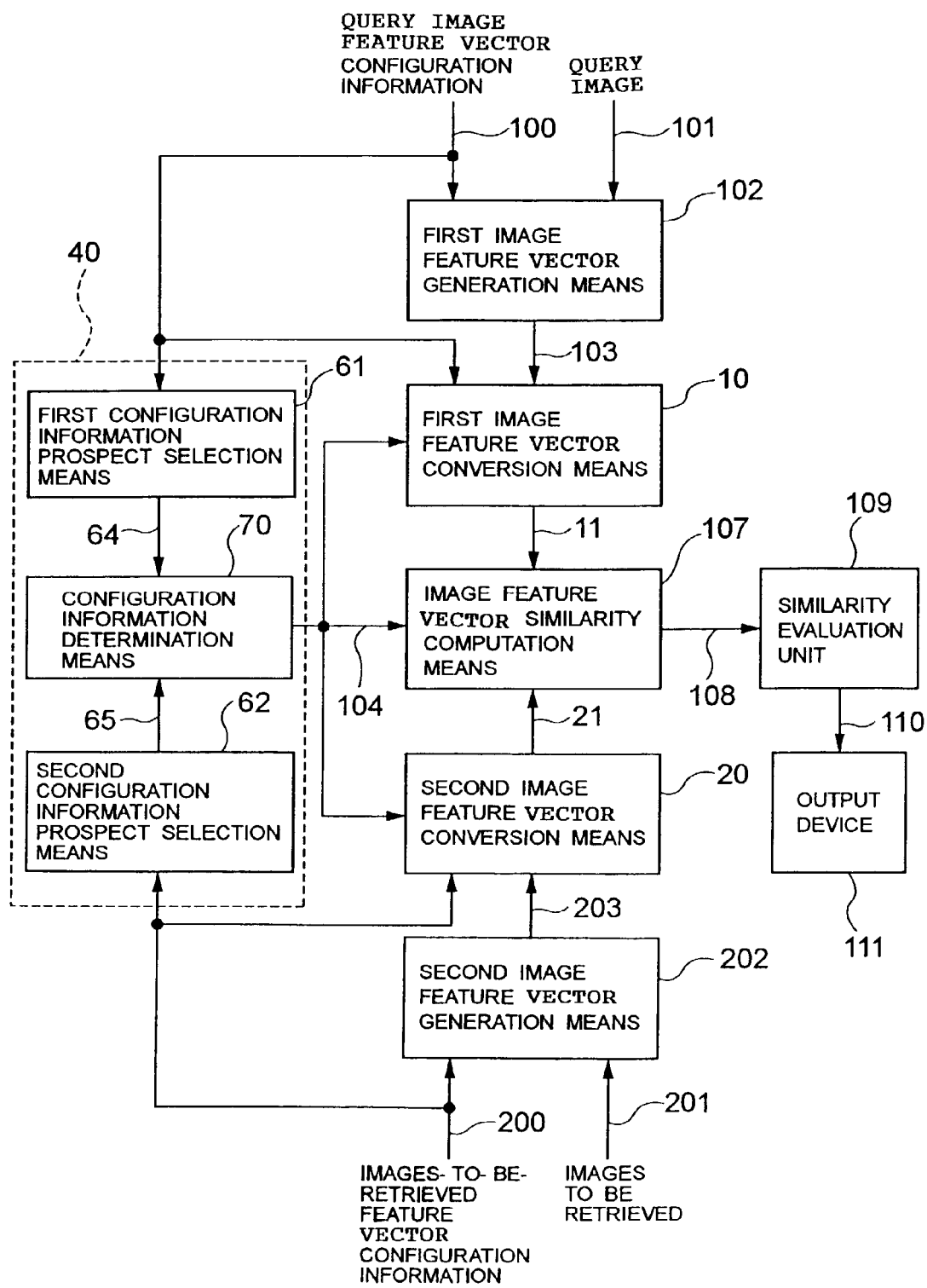
FIG. 6 is a block diagram of the configuration of the image retrieval system according to a fifth aspect of the present invention.

In FIG. 6, in the fifth aspect of the present invention, the configuration information generation means 40 in FIG. 5 comprises the first configuration information prospect selection means 61, the second configuration information prospect selection means 62, and configuration information determination means 70.

The first configuration information prospect selection means 61 refers to the query image feature vector configuration information 100, and outputs a list of possible feature vector configurations of the query image feature vector as the configuration information list 64. The second configuration information prospect selection means 62 refers to the images-to-be-retrieved feature vector configuration information 200, and outputs a list of the possible feature vector configurations of the images-to-be-retrieved feature vector as the configuration information list 65.

The configuration information determination means 70 refers to the configuration information list 64 obtained by the first configuration information prospect selection means 61 and the configuration information list 65 obtained by the second configuration information prospect selection means 62, and determines whether or not there is configuration information contained in both configuration information lists 64 and 65. If there is any configuration information contained in them, the optimum configuration information for use in a similarity computation is output as the similarity computation image feature vector 104.

The method of determining the configuration information for use in computing the similarity between image feature vectors can be: adopting the configuration of the feature vector of a query image or images to be retrieved; using only a common portion of the components contained in the feature vector of a query image or images to be retrieved; using all existing portions of the components of the feature vectors of one of the query image and the images to be retrieved; interpolating a constant value, etc.

According to the present aspect of the invention, the feature vectors of the images to be retrieved and the feature vector of the query image are converted and compared according to the common similarity computation image feature vector configuration information, and the similarity of them is computed. Therefore, images can be compared and retrieved without preparing any image feature vectors having common configurations, in a system in which image feature vectors having various coefficient configurations coexist. Thus, images can be retrieved in a simple device configuration.

Furthermore, the similarity of image feature vectors is normalized based on the contents of the configuration information, thereby realizing the retrieval by comparing the similarity value obtained by comparison among image feature vectors having various configurations based on the same standard.

(Sixth Aspect of the Present Invention)

The sixth aspect of the present invention will be described below in detail by referring to the attached drawings.

Figure 7:
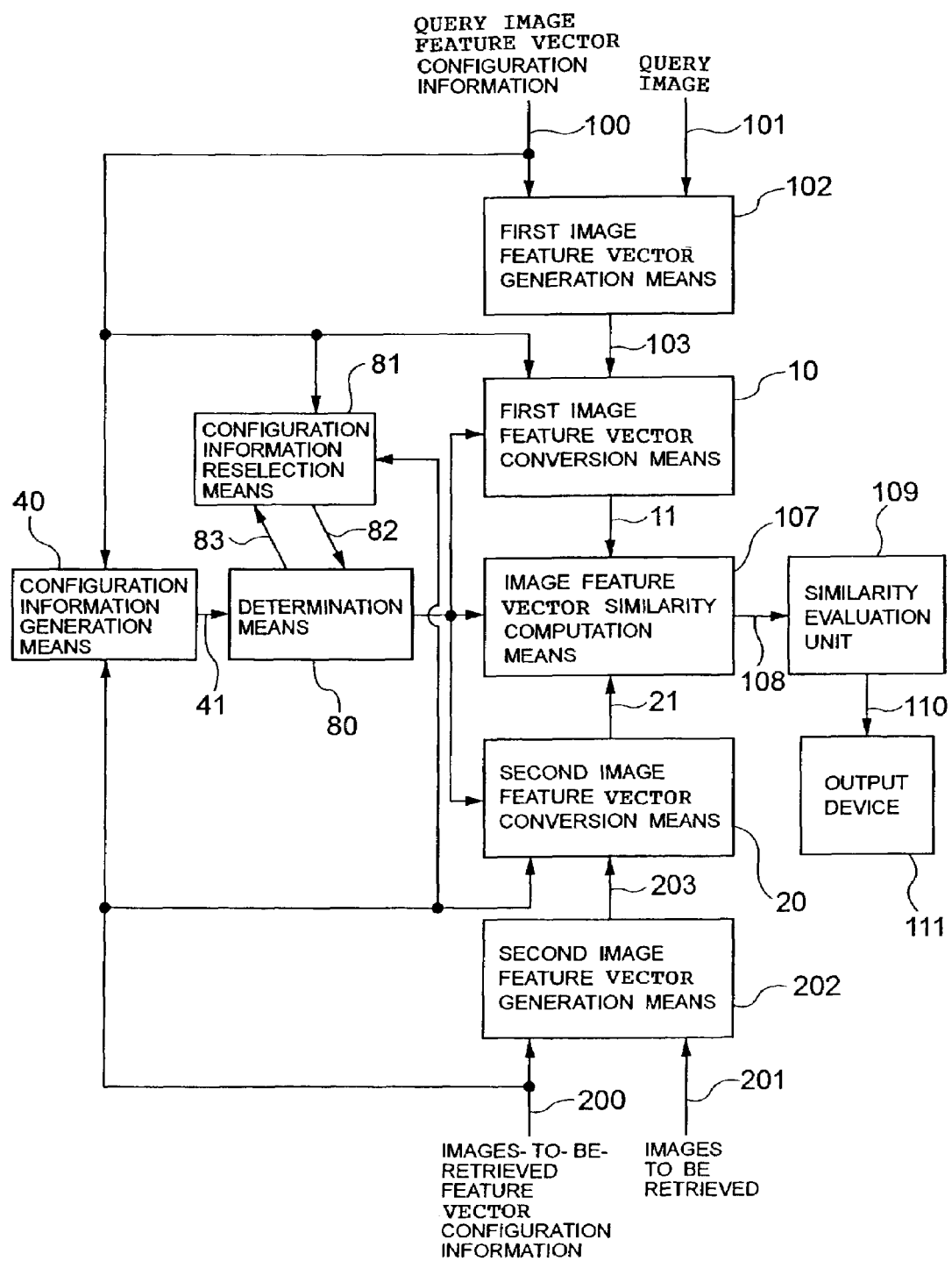
FIG. 7 is a block diagram of the configuration of the image retrieval system according to a sixth aspect of the present invention.
Figure 8:
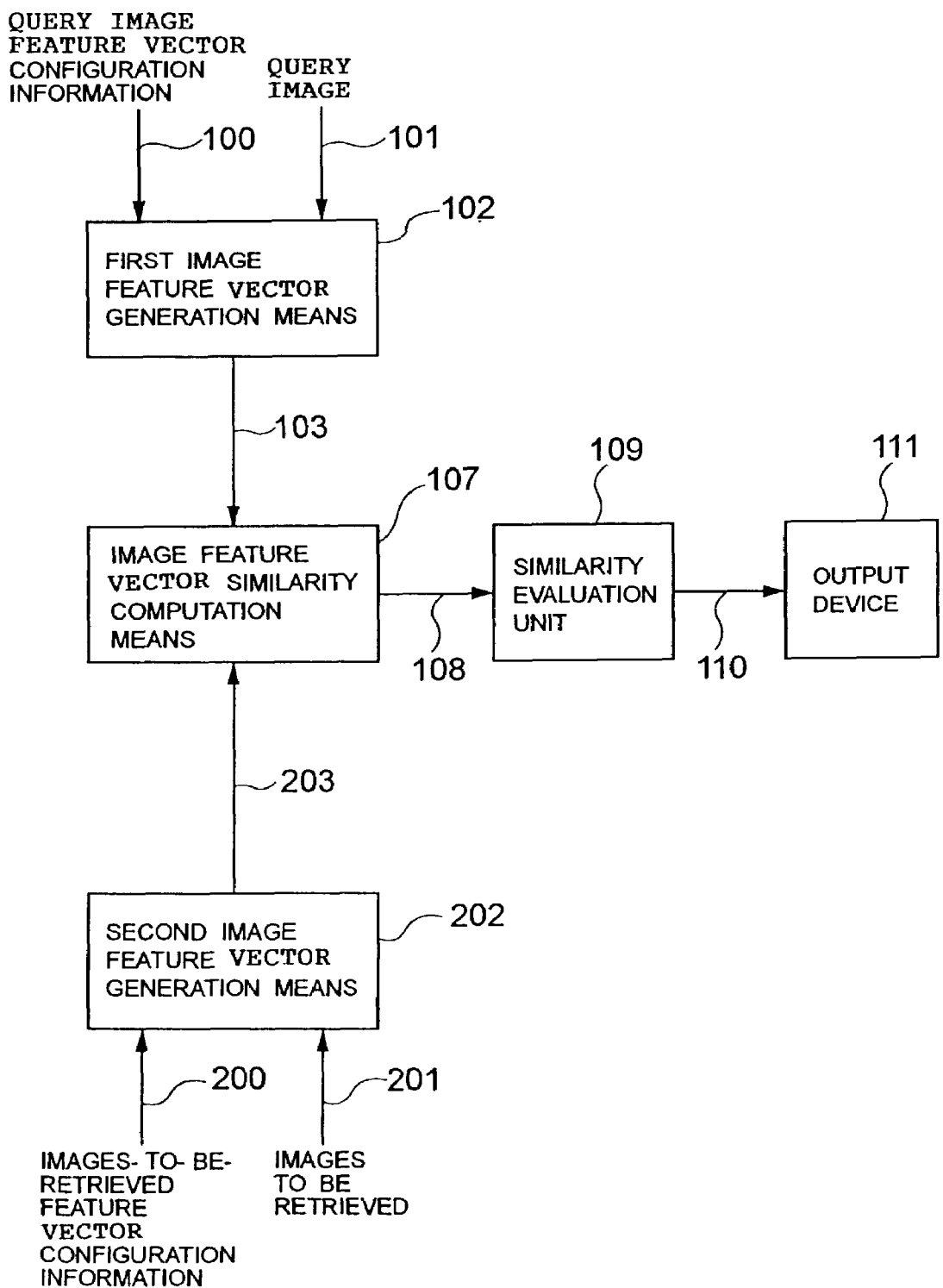
FIG. 8 is a block diagram of a central configuration of the conventional image retrieval system.

In FIG. 7, according to the sixth aspect of the present invention further comprises the determination means 80 and the configuration information reselection means 81 in addition to the configuration according to the fourth aspect shown in FIG. 5.

The determination means 80 determines whether or not both query image feature vector and images-to-be-retrieved feature vector can be converted according to the similarity computation image feature vector configuration information 41 generated by the configuration information generation means 40 or the similarity computation image feature vector configuration information 83 generated by the configuration information reselection means 81. When the determination means 80 determines that the conversion cannot be performed, the configuration information reselection means 81 reselects again the similarity computation image feature vector configuration information 83. If the determination means 80 determines that the conversion can be performed, then the configuration information reselection means 81 outputs the generated similarity computation image feature vector configuration information 84.

The first image feature vector conversion means 10 converts the query image feature vector 103 into the first image feature vector 11 for use in a similarity computation according to the similarity computation image feature vector configuration information 84. The second image feature vector conversion means 20 converts the image-to-be-retrieved feature vector 203 into the second image feature vector 21 for use in a similarity computation according to the similarity computation image feature vector configuration information 84.

According to the present aspect of the invention, the feature vectors of the images to be retrieved and the feature vector of the query image are converted and compared according to the common similarity computation image feature vector configuration information, and the similarity of them is computed. Therefore, images can be compared and retrieved without preparing image feature vectors having common configurations, in a system in which image feature vectors having various coefficient configurations coexist. Thus, images can be retrieved in a simple device configuration.

Furthermore, the similarity of image feature vectors is normalized based on the contents of the configuration information, thereby realizing the retrieval by comparing the similarity value obtained by comparison among image feature vectors having various configurations based on the same standard.

EMBODIMENTS

Next, a description will be made on embodiments of the present invention.

First Embodiment

A first embodiment of the present invention is provided with a keyboard and a mouse as an input device, a personal computer as an image retrieval apparatus, a magnetic disk storage device as a storage device, and a display as an output device.

The personal computer comprises first image feature vector generation means, first image feature vector conversion means, second image feature vector conversion means, image feature vector similarity computation means, and a central processing unit as a similarity evaluation unit. In addition the magnetic disk storage device stores an image feature vector and configuration information for an image.

In this embodiment, the frequency distribution feature vector of an image is used as an example of an image feature vector. A generating method of the frequency distribution feature vector of a image is used as follows. That is, an image is divided into 8×8 blocks, and an average color of each block is computed, and a reduced image of a fixed size (8 pixels×8 pixels) is generated. Then, a discrete cosine transform (DCT transform) is performed on the reduced image, and a low brequency coefficient sequence of a luminance signal (Y) and chrominance signals (Cb, Cr) is extracted from among the obtained coefficients. Furthermore, the obtained DCT coefficient is converted using a conversion table, thereby obtaining a frequency distribution feature vector.

The configuration information specifies the number of coefficients included in the feature vector.

In a system in which still pictures and moving pictures coexist, it is assumed that a frame (image) extracted from moving pictures has a frequency distribution feature vector having a total of 12 coefficients including 6 coefficients for a luminance signal and 3 coefficients for each chrominance signal, and a still picture has a frequency distribution feature vector having a total of 18 coefficients including 6 coefficients for a luminance signal and 6 coefficients for each chrominance signal. The configuration information describing the frequency distribution feature vector and the configuration (example: a total of 18 coefficients including 6 coefficients for a luminance signal and 6 coefficients for each chrominance signal) of the frequency distribution feature vector is stored in a magnetic disk device.

Assume that an input image is specified by a keyboard or a mouse. In the present embodiment, it is assumed that a frequency distribution feature vector having a total of 12 coefficients including 6 coefficients for a luminance signal and 3 coefficients for each chrominance signal is used as an image feature vector of an input image.

The central processing unit compares the input configuration information of the total of 12 coefficients including 6 coefficients for a luminance signal and 3 coefficients for each chrominance signal with the information of 18 coefficients and 12 coefficients stored in a magnetic disk, and generates the configuration information indicating the number of coefficients to be used in a similarity computation. For example, assuming that the method of determining the coefficients to be used is the method of adopting the smaller number of coefficients, the coefficient information is constantly a total of 12 coefficients including 6 coefficients for a luminance signal and 3 coefficients for each chrominance signal. It is also possible to fix the configuration information for use in a similarity computation to, for example, a total of 12 coefficients including 6 coefficients for a luminance signal and 3 coefficients for each chrominance signal without comparing the configuration information.

When the configuration information is generated, a list of possible feature vectors of a query image feature vector and a list of possible image feature vectors of images to be retrieved are generated, and the optimum configuration for a similarity computation can be selected from both lists. For example, from both of the information that the query image feature vector can be converted only into any of the patterns of 12 coefficients, for example, the coefficient of a luminance signal of 0, 1, 3, and 6 coefficients in order from the lowest, and the coefficient of each chrominance signal of 0, 1, and 3 coefficients, and the information that the feature vectors of the stored images to be retrieved can be converted into only any of the patterns of 18 coefficients, for example, the coefficient of a luminance signal of 0, 1, 3, and 6 coefficients in order from the lowest, and the coefficient of each chrominance signal of 0, 1, 3, and 6 coefficients, it can be determined that possible combinations of the conversion of both image feature vectors are the luminance signal of 0, 1, 3, and 6 coefficients and each chrominance signal of 0, 1, and 3 coefficients. Furthermore, the configuration information can be generated in the combination of a total of 12 coefficients including 6 coefficients for a luminance signal and 3 coefficients for each chrominance signal containing the largest number of coefficients. Furthermore, the configuration information for use in the externally input similarity computation can be used after confirming that they are included in both lists.

Then, the central processing unit receives the configuration information of total of 12 coefficients including 6 coefficients for a luminance signal and 3 coefficients for each chrominance signal, generates an image feature vector including a total of 12 coefficients including 6 coefficients for a luminance signal and 3 coefficients for each chrominance signal for the frequency distribution feature vector of an input image, and an image feature vector including a total of 12 coefficients including 6 coefficients for a luminance signal and 3 coefficients for each chrominance signal from the image feature vector of each images to be retrieved, and computes a distance computation between feature vectors of each input image.

Then, the central processing unit selects a shorter distance to the frequency distribution feature vector of a query image, and outputs the image in the image database corresponding to the frequency distribution feature vector of the images to be retrieved as an image similar to the query image on the display.

Second Embodiment

Described below will be a second embodiment of the present invention.

The present embodiment has the same configuration as the first embodiment, but the central processing unit of a personal computer can also function, unlike the first embodiment, as means of interpolating an appropriate coefficient into an image feature vector of a query image or an images to be retrieved.

In a system in which still pictures and moving pictures coexist, it is assumed that a frame (image) extracted from moving pictures and still pictures have a frequency distribution feature vector having a total of 12 coefficients including 6 coefficients for a luminance signal and 3 coefficients for each chrominance signal. The configuration information describing the frequency distribution feature vector and the configuration information (example: a total of 12 coefficients including 6 coefficients for a luminance signal and 3 coefficients for each chrominance signal) of the frequency distribution feature vector is stored in a magnetic disk device.

Assume that an input image is specified by a keyboard or a mouse. In the present embodiment, it is assumed that a frequency distribution feature vector having a total of 18 coefficients including 6 coefficients for a luminance signal and 6 coefficients for each chrominance signal is used as an image feature vector of an input image.

The central processing unit compares the input configuration information of the total of 18 coefficients including 6 coefficients for a luminance signal and 6 coefficients for each chrominance signal with the configuration information of 12 coefficients stored in a magnetic disk, and generates the configuration information indicating the number of coefficients to be used in a similarity computation. For example, assuming that the method of determining the coefficients to be used is the method of adopting the larger number of coefficients, the configuration information is constantly a total of 18 coefficients including 6 coefficients for a luminance signal and 6 coefficients for each chrominance signal.

The central processing unit interpolates an appropriate value into each of the three insufficient coefficients for each chrominance signal to convert the frequency distribution feature vector (a total of 12 coefficients including 6 coefficients for a luminance signal and 3 coefficients for each chrominance signal) of the image to be retrieved into 18 coefficients (6 coefficients for a luminance signal and 6 coefficients for each chrominance signal) adopted as applicable coefficients.

Then, the central processing unit receives the coefficient information of a total of 18 coefficients including 6 coefficients for a luminance signal and 6 coefficients for each chrominance signal, and obtains the image feature vector of each images to be retrieved, that is, a total of 18 coefficients including 6 coefficients for a luminance signal and 6 coefficients for each chrominance signal for the frequency distribution feature vector of an input image and a total of 18 coefficients including 6 coefficients for a luminance signal and 6 coefficients for each chrominance signal as a result of the interpolation of coefficients, thereby performing a distance computation between the feature vectors of the images.

Then, the central processing unit selects a shorter distance to the frequency distribution feature vector of a query image, and outputs an image in the image database corresponding to the frequency distribution feature vector of the images to be retrieved as an image similar to the query image on the display.

Third Embodiment

Described below will be a third embodiment of the present invention.

The present embodiment has the same configuration as the first embodiment, but is different from the second embodiment in that the central processing unit of a personal computer also functions as means of normalizing the similarity.

In a system in which still pictures and moving pictures coexist, it is assumed that a frame (image) extracted from moving pictures has a frequency distribution feature vector having a total of 12 coefficients including 6 coefficients for a luminance signal and 3 coefficients for each chrominance signal, and a still picture has a frequency distribution feature vector having a total of 18 coefficients including 6 coefficients for a luminance signal and 6 coefficients for each chrominance signal. The configuration information describing the frequency distribution feature vector and the configuration information (example: a total of 18 coefficients including 6 coefficients for a luminance signal and 6 coefficients for each chrominance signal) of the frequency distribution feature vector is stored in a magnetic disk device.

Assume that an input image is specified by a keyboard or a mouse. In the present embodiment, it is assumed that a frequency distribution feature vector having a total of 18 coefficients including 6 coefficients for a luminance signal and 6 coefficients for each chrominance signal is used as an image feature vector of an input image.

The central processing unit compares the input coefficient information of the total of 18 coefficients including 6 coefficients for a luminance signal and 6 coefficients for each chrominance signal with the coefficient information of 12 coefficients stored in a magnetic disk, and generates the coefficient information indicating the number of coefficients to be used in a similarity computation. For example, assuming that the method of determining the configuration information is the method of adopting the smaller number of coefficients, the coefficient information is a total of 18 coefficients including 6 coefficients for a luminance signal and 6 coefficients for each chrominance signal when images to be retrieved are still pictures. If images to be retrieved are a frame of moving pictures, the coefficient information is a total of 12 coefficients including 6 coefficients for a luminance signal and 3 coefficients for each chrominance signal.

Then, the central processing unit receives coefficient information, and performs a computation of the distance between feature vectors of images on the coefficients described in the coefficient information.

The central processing unit then receives the coefficient information, and weights the computed distance depending on the number and the type of coefficients, thereby normalizing the value of the distance. For example, when 12 coefficients are used, a simple division by 12 can be performed, or an addition with a weight is performed on each element, for example, a heavy weight is assigned to a low frequency component and a light weight is assigned to a high frequency component.

Then, the central processing unit selects a shorter distance to the frequency distribution feature vector of a query image, and outputs an image in the image database corresponding to the frequency distribution feature vector of the images to be retrieved as an image similar to the query image on the display.

Described above is the case in which the numbers of coefficients prepared as configuration information are 12 and 18 coefficients, but an arbitrary number or combination can be used.

The image feature vector and the configuration information can relate to not only a frequency distribution feature vector but also a feature vector of an edge, texture, color, shape, motion, etc.

For example, the image feature vector may be the feature vector indicating the edge or texture of an image for example, direction of the edge or the texture, and the configuration information may be the information about the type of direction of en edge or texture. In this case, when feature vectors having four types of directions and one type of no-direction are compared with feature vectors having eight types of directions, regarding the type of direction of edge which is not contained in four types of feature vectors among eight types of feature vectors, comparison and retrieval can be performed after determining the type by a method such as containing in any of the remaining four types according to the frequency or the rate.

Additionally, for example, an image feature vector can be one or more dominant colors, frequency, and distribution, and the configuration information can relate to the number of dominant colors and a color space. In this case, for example, when feature vectors having different number of dominant colors or color space are compared, the comparison can be carried out after converting them into common color space and number of colors.

The configuration information can relate to the information about the type of shape and density using the image feature vector as a feature vector indicating the shape of an image. In this case, when feature vectors having four types are compared with feature vectors having eight types, regarding a pattern of the shape which is not contained in four types of feature vectors among eight types of feature vectors, comparison and retrieval can be performed after determining the type by a method such as containing in any of the remaining four types according to the pattern of the shape, the frequency or the rate.

The configuration information can relate to the information about the type of motion and density using the image feature vector as a feature vector indicating the motion of an image. In this case, when feature vectors having four types are compared with feature vectors having eight types, regarding a pattern of motion which is not contained in four types of feature vectors among eight types of feature vectors, comparison and retrieval can be performed after determining the type by a method such as containing in any of the remaining four types according to the pattern of the shape, the range of the motion, the frequency or the rate.

Furthermore, the image feature vector can be generated by extracting a feature vector of each rectangular area after dividing an image into rectangular areas, and the configuration information can relate to rectangular areas (number of divisions) In this case, when image feature vectors having different numbers of divisions are compared, the comparison and retrieval can be performed after adjusting the number of areas or converting the number into the optimum number of areas. It is not necessary that an area is rectangular, but an arbitrary shape of area can be used. In addition, all or a part of an image can be used in extracting a feature vector.

Described above are preferred embodiments of the present invention, but the present invention is not limited to the above mentioned preferred aspects and embodiments, but can be realized in variations in the scope of its technological concept.

As described above, the present invention has the following effects.

The first effect is realized by the comparison and retrieval of each image in a system in which image feature vectors having various configurations coexist with a simple device configuration.

The above mentioned effect can be attained by determining a combination patterns (configuration information) of elements for use in a similarity computation based on the elements of the combination patterns of elements configuring the image feature vector for use in a similarity computation using the image feature vectors of images to be retrieved and the image feature vector of an input query image, and by computing the similarity of them by comparing the image feature vectors of the images to be retrieved with the image feature vector of the query image based on the combination pattern of the determined elements.

The second effect is realized by comparison and retrieval of a similarity value computed by comparing image feature vectors having various configuration information based on the same standard.

The above mentioned effect can be attained by comparing and retrieving similarity values computed by comparing image feature vectors having various configurations by normalizing the similarity of image feature vectors using the configuration information for use in a similarity computation on the same standard.

What is claimed is:

1. An image retrieval apparatus which retrieves an image similar to a predetermined query image from images to be retrieved by using an image feature vector when the configurations of the feature vector of a query image and the feature vector of an image to be compared are different from each other, comprising:

image feature vector generation means for generating a frequency distribution feature vector of an image, said image feature vector generation means partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

first image feature vector conversion means for receiving similarity computation image feature vector configuration information which describes a configuration of an image feature vector for use in a similarity computation and is a frequency distribution feature vector of an image, and converting the image feature vector of the query image into a first image feature vector according to the similarity computation image feature vector configuration information; and second image feature vector conversion means for converting the image feature vector of the images to be retrieved into a second image feature vector according to the similarity computation image feature vector configuration information, wherein similarity between the first image feature vector and the second image feature vector is computed according to the similarity computation image feature vector configuration information.

2. The image retrieval apparatus according to claim 1, wherein when similarity between the first image feature vector and the second image feature vector is computed, normalized similarity can be computed depending on contents of the similarity computation image feature vector configuration information.

3. The image retrieval apparatus according to claim 1, wherein the image feature vector can be generated by obtaining a reduced image from an image of which a feature vector is to be extracted, and performing discrete cosine transform and quantization on the reduced image.

4. The image retrieval apparatus according to claim 1, wherein the similarity computation image feature vector configuration information relates to a configuration of discrete cosine transform coefficients forming an image feature vector.

5. The image retrieval apparatus according to claim 1, wherein the image feature vector is one or more dominant colors of an image, and the similarity computation image feature vector configuration information relates to the dominant color(s).

6. The image retrieval apparatus according to claim 1, wherein the image feature vector indicates a direction of an edge of an image, and the similarity computation image feature vector configuration information relates to a type of the direction of the edge.

7. The image retrieval apparatus according to claim 1, wherein the image feature vector indicates a texture of an image, and the similarity computation image feature vector configuration information relates to a type of the texture.

8. The image retrieval apparatus according to claim 1, wherein the image feature vector indicates a shape of an image, and the similarity computation image feature vector configuration information relates to a type of the shape.

9. The image retrieval apparatus according to claim 1, wherein the image feature vector indicates a motion of an image, and the similarity computation image feature vector configuration information relates to a type of the motion.

10. The image retrieval apparatus according to claim 1, wherein the image feature vector is generated by extracting a feature vector of each rectangular area after dividing an image into rectangular areas, and the similarity computation image feature vector configuration information relates to the rectangular area.

11. The image retrieval apparatus according to claim 1, wherein said frequency distribution feature vector of the image is a coefficient generated by a discrete cosine transformer (DCT) on a reduced image of a fixed size.

12. The image retrieval apparatus according to claim 11, wherein said frequency distribution feature vector of the image is the smaller number of coefficients generated by the DCT.

13. The image retrieval apparatus according to claim 12, wherein a configuration of said feature vector of the image is to define an order of the smaller number.

14. The apparatus of claim 1, wherein said color signals are a luminance (Y) and chrominance (Cb, Cr) signals.

15. An image retrieval apparatus which retrieves an image similar to a predetermined query image from images to be retrieved by using an image feature vector when the configurations of the feature vector of a query image and the feature vector of an image to be compared are different from each other, comprising:

image feature vector generation means for generating a frequency distribution feature vector of an image, said image feature vector generation means partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

first configuration information prospect selection means for referring to query image feature vector configuration information describing a configuration of an image feature vector of the query image, and outputting a configuration information list of possible feature vector configurations of the image feature vector of the query image;

second configuration information prospect selection means for referring to images-to-be-retrieved feature vector configuration information describing the configuration of an image feature vector of the image to be retrieved, and outputting a configuration information list of possible feature vector configurations of the image feature vectors of the images to be retrieved;

configuration information discrimination means for receiving similarity computation image feature vector configuration information which describes a configuration of an image feature vector for use in a similarity computation and is a frequency distribution feature vector of an image, and determining whether or not the similarity computation image feature vector configuration information is contained in both configuration information list obtained from said first configuration information prospect selection means and a configuration information list obtained from said second configuration information prospect selection means;

first image feature vector conversion means for converting the image feature vector of the query image into a first image feature vector for use in the similarity computation according to the similarity computation image feature vector configuration information when said configuration information discrimination means determines that the information is contained in both lists; and second image feature vector conversion means for converting the image feature vectors of the images to be retrieved into a second image feature vector for use in the similarity computation according to the similarity computation image feature vector configuration information when said configuration information discrimination means determines tat the information is contained in both lists, wherein similarity between the first image feature vector and the second image feature vector is computed according to the similarity computation image feature vector configuration information.

16. The apparatus of claim 15, wherein said color signals are a luminance (Y) and chrominance (Cb, Cr) signals.

17. An image retrieval apparatus which retrieves an image similar to a predetermined query image from images to be retrieved by using an image feature vector when the configurations of the feature vector of a query image and the feature vector of an image to be compared are different from each other, comprising:

image feature vector generation means for generating a frequency distribution feature vector of an image, said image feature vector generation means partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

determination means for determining, according to similarity computation image feature vector configuration information which describes a configuration of an image feature vector for use in a similarity computation and is a frequency distribution feature vector of an image given as input or similarity computation image feature vector configuration information which describes a configuration of an image feature vector for use in a similarity computation and is a frequency distribution feature vector of an image generated by configuration information reselection means, whether or not both of image feature vector of the query image and image feature vectors of the images to be retrieved can be converted;

said configuration information reselection means for selecting similarity computation image feature vector configuration information again when said determination means determines that the image feature vectors cannot be converted;

first image feature vector conversion means for converting the image feature vector of the query image into a first image feature vector for use in a similarity computation according to the similarity computation image feature vector configuration information when said determination means determines that the image feature vectors can be converted; and second image feature vector conversion means for converting the image feature vectors of the images to be retrieved into a second image feature vector for use in the similarity computation according to the similarity computation image feature vector configuration information when said determination means determines tat the image feature vectors can be converted, wherein similarity between the first image feature vector and the second image feature vector is computed according to the similarity computation image feature vector configuration information.

18. The apparatus of claim 17, wherein said color signals are a luminance (Y) and chrominance (Cb, Cr) signals.

19. An image retrieval apparatus which retrieves an image similar to a predetermined query image from images to be retrieved by using an image feature vector when the configurations of the feature vector of a query image and the feature vector of an image to be compared are different from each other, comprising:

image feature vector generation means for generating a frequency distribution feature vector of an image, said image feature vector generation means partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

configuration information generation means for generating similarity computation image feature vector configuration information which describes a configuration of an image feature vector for use in a similarity computation and is a frequency distribution feature vector of an image;

first image feature vector conversion means for convening the image feature vector of the query image into a first image feature vector for use in a similarity computation according to the similarity computation image feature vector configuration information; and second image feature vector conversion means for converting the image feature vectors of the images to be retrieved into a second image feature vector for use in a similarity computation according to the similarity computation image feature vector configuration information, wherein similarity between the first image feature vector and the second image feature vector is computed according to the similarity computation image feature vector configuration information.

20. The image retrieval apparatus according to claim 19, wherein said configuration information generation means refers to query image feature vector configuration information describing a configuration of the image feature vector of the query image and images-to-be-retrieved feature vector configuration information describing a configuration of the image feature vectors of the images to be retrieved, and generates similarity computation image feature vector configuration information.

21. The apparatus of claim 19, wherein said color signals are a luminance (Y) and chrominance (Cb, Cr) signals.

22. An image retrieval apparatus which retrieves an image similar to a predetermined query image from images to be retrieved by using an image feature vector when the configurations of the feature vector of a query image and the feature vector of an image to be compared are different from each other, comprising:

image feature vector generation means for generating a frequency distribution feature vector of an image, said image feature vector generation means partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

first configuration information prospect selection means for referring to query image feature vector configuration information which describes a configuration of an image feature vector of the query image and is a frequency distribution feature vector of an image, and outputting a configuration information list of possible feature vector configurations of the image feature vector of the query image;

second configuration information prospect selection means for referring to images-to-be-retrieved feature vector configuration information describing the configuration of an image feature vector of the image to be retrieved, and outputting a configuration information list of possible feature vector configurations of the image feature vectors of the images to be retrieved;

configuration information determination means for referring to the configuration information list obtained by said first configuration information prospect selection means and the configuration information list obtained by said second configuration information prospect selection means, and determining similarity computation image feature vector configuration information describing a configuration of an image feature vector for use in a similarity computation;

first image feature vector conversion means for converting the image feature vector of the query image into a first image feature vector for use in the similarity computation according to the similarity computation image feature vector configuration information; and second image feature vector conversion means for converting the image feature vectors of the images to be retrieved into a second image feature vector for use in the similarity computation according to the similarity computation image feature vector configuration information, wherein similarity between the first image feature vector and the second image feature vector is computed according to the similarity computation image feature vector configuration information.

23. The apparatus of claim 22 wherein said color signals are a luminance (Y) and chrominance (Cb, Cr) signals.

24. An image retrieval apparatus which retrieves an image similar to a predetermined query image from images to be retrieved by using an image feature vector when the configurations of the feature vector of a query image and the feature vector of an image to be compared are different from each other, comprising:

image feature vector generation means for generating a frequency distribution feature vector of an image, said image feature vector generation means partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

configuration information generation means for generating similarity computation image feature vector configuration information which describes a configuration of an image feature vector for use in a similarity computation and is a frequency distribution feature vector of an image;

determination means for determining, according to similarity computation image feature vector configuration information generated by said configuration information generation means or configuration information reselection means, whether or not both of image feature vector of the query image and image feature vectors of the images to be retrieved can be converted;

said configuration information reselection means for selecting similarity computation image feature vector configuration information again when said determination means determines that the image feature vectors cannot be converted;

first image feature vector conversion means for converting the image feature vector of the query image into a first image feature vector for use in a similarity computation according to the similarity computation image feature vector configuration information when said determination means determines that the image feature vectors can be converted; and second image feature vector conversion means for converting the image feature vectors of the images to be retrieved into a second image feature vector for use in the similarity computation according to the similarity computation image feature vector configuration information when said determination means determines that the image feature vectors can be converted, wherein similarity between the first image feature vector and the second image feature vector is computed according to the similarity computation image feature vector configuration information.

25. The apparatus of claim 24, wherein said color signals are a luminance (Y) and chrominance (Cb, Cr) signals.

26. An image retrieving method of retrieving an image similar to a predetermined query image from images to be retrieved using an image feature vector when the configurations of the feature vector of a query image and the feature vector of an image to be compared are different from each other, comprising:

image feature vector generation step for generating a frequency distribution feature vector of an image, said image feature vector generation step partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a first image feature vector conversion step of receiving similarity computation image feature vector configuration information which describes a configuration of an image feature vector for use in a similarity computation and is a frequency distribution feature vector of an image, and converting the image feature vector of the query image into a first image feature vector according to the similarity computation image feature vector configuration information;

a second image feature vector conversion step of converting the image feature vector of the images to be retrieved into a second image feature vector according to the similarity computation image feature vector configuration information; and a step of computing similarity between the first image feature vector and the second image feature vector according to the similarity computation image feature vector configuration information.

27. The image retrieving method according to claim 26, wherein when similarity between the first image feature vector and the second image feature vector is computed, normalized similarity can be computed depending on contents of the similarity computation image feature vector configuration information.

28. The image retrieving method according to claim 26, wherein the image feature vector can be generated by obtaining a reduced image from an image of which a feature vector is to be extracted, and performing discrete cosine transform and quantization on the reduced image.

29. The image retrieving method according to claim 26, wherein the similarity computation image feature vector configuration information relates to a configuration of discrete cosine transform coefficients forming an image feature vector.

30. The image retrieving method according to claim 26, wherein the image feature vector is one or more dominant colors of an image, and the similarity computation image feature vector configuration information relates to the dominant color(s).

31. The image retrieving method according to claim 26, wherein the image feature vector indicates a direction of an edge of an image, and the similarity computation image feature vector configuration information relates to a type of the direction of the edge.

32. The image retrieving method according to claim 26, wherein the image feature vector indicates a texture of an image, and the similarity computation image feature vector configuration information relates to a type of the texture.

33. The image retrieving method according to claim 26, wherein the image feature vector indicates a shape of an image, and the similarity computation image feature vector configuration information relates to a type of the shape.

34. The image retrieving method according to claim 26, wherein the image feature vector indicates a motion of an image, and the similarity computation image feature vector configuration information relates to a type of the motion.

35. The image retrieving method according to claim 26, wherein the image feature vector is generated by extracting a feature vector of each rectangular area after dividing an image into rectangular areas, and the similarity computation image feature vector configuration information relates to the rectangular area.

36. The image retrieving method according to claim 26, wherein said frequency distribution feature vector of the image is a coefficient generated by a discrete cosine transformer (DCT) on a reduced image of a fixed size.

37. The image retrieving method according to claim 36, wherein said frequency distribution feature vector of the image is the smaller number of coefficients generated by the DCT.

38. The image retrieval method according to claim 37, wherein a configuration of said feature vector of the image is to define an order of the smaller number.

39. The method of claim 26, wherein said color signals are a luminance (Y) and chrominance (Cb, Cr) signals.

40. An image retrieving method of retrieving an image similar to a predetermined query image from images to be retrieved by using an image feature vector when the configurations of the feature vector of a query image and the feature vector of an image to be compared are different from each other, comprising:

image feature vector generation step for generating a frequency distribution feature vector of an image, said image feature vector generation step partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a first configuration information prospect selection step of referring to query image feature vector configuration information which describes a configuration of an image feature vector of the query image, and outputting a configuration information list of possible feature vector configurations of the image feature vector of the query image;

a second configuration information prospect selection step of referring to images-to-be-retrieved feature vector configuration information describing the configuration of an image feature vector of the image to be retrieved, and outputting a configuration information list of possible feature vector configurations of the image feature vectors of the images to be retrieved;

a configuration information discrimination step of receiving similarity computation image feature vector configuration information which describes a configuration of an image feature vector for use in a similarity computation and is a frequency distribution feature vector of an image, and determining whether or not the similarity computation image feature vector configuration information is contained in both configuration information list obtained in said first configuration information prospect selection step and a configuration information list obtained in said second configuration information prospect selection step;

a first image feature vector conversion step of converting the image feature vector of the query image into a first image feature vector for use in the similarity computation according to the similarity computation image feature vector configuration information when said configuration information discrimination step determines that the information is contained in both lists;

a second image feature vector conversion step of converting the image feature vectors of the images to be retrieved into a second image feature vector for use in the similarity computation according to the similarity computation image feature vector configuration information when said configuration information discrimination step determines that the information is contained in both lists; and a step of computing similarity between the first image feature vector and the second image feature vector according to the similarity computation image feature vector configuration information.

41. The method of claim 40, wherein said color signals are a luminance (Y) and chrominance (Cb, Cr) signals.

42. An image retrieving method of retrieving an image similar to a predetermined query image from images to be retrieved by using an image feature vector when the configurations of the feature vector of a query image and the feature vector of an image to be compared are different from each other, comprising:

image feature vector generation step for generating a frequency distribution feature vector of an image, said image feature vector generation step partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a determination step of determining, according to similarity computation image feature vector configuration information which describes a configuration of an image feature vector for use in a similarity computation and is a frequency distribution feature vector of an image given as input or similarity computation image feature vector configuration information which describes a configuration of an image feature vector for use in a similarity computation and is a frequency distribution feature vector of an image generated in a configuration information reselection step, whether or not both of image feature vector of the query image and image feature vectors of the images to be retrieved can be converted;

said configuration information reselection step of selecting similarity computation image feature vector configuration information again when said determination step determines that the image feature vectors cannot be converted;

a first image feature vector conversion step of converting the image feature vector of the query image into a first image feature vector for use in a similarity computation according to the similarity computation image feature vector configuration information when said determination step determines that the image feature vectors can be converted;

a second image feature vector conversion step of converting the image feature vectors of the images to be retrieved into a second image feature vector for use in the similarity computation according to the similarity computation image feature vector configuration information when said determination step determines that the image feature vectors can be converted; and a step of computing similarity between the first image feature vector and the second image feature vector according to the similarity computation image feature vector configuration information.

43. The method of claim 42, wherein said color signals are a luminance (Y) and chrominance (Cb, Cr) signals.

44. An image retrieving method of retrieving an image similar to a predetermined query image from images to be retrieved by using an image feature vector when the configurations of the feature vector of a query image and the feature vector of an image to be compared are different from each other, comprising:

image feature vector generation step for generating a frequency distribution feature vector of an image, said image feature vector generation step partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a configuration information generation step of generating similarity computation image feature vector configuration information which describes a configuration of an image feature vector for use in a similarity computation and is a frequency distribution feature vector of an image;

a first image feature vector conversion step of converting the image feature vector of the query image into a first image feature vector for use in a similarity computation according to the similarity computation image feature vector configuration information;

a second image feature vector conversion step of converting the image feature vectors of the images to be retrieved into a second image feature vector for use in a similarity computation according to the similarity computation image feature vector configuration information; and a step of computing similarity between the first image feature vector and the second image feature vector according to the similarity computation image feature vector configuration information.

45. The method of claim 44, wherein said color signals are a luminance (Y) and chrominance (Cb, Cr) signals.

46. An image retrieving method of retrieving an image similar to a predetermined query image from images to be retrieved by using an image feature vector when the configurations of the feature vector of a query image and the feature vector of an image to be compared are different from each other, comprising:

image feature vector generation step for generating a frequency distribution feature vector of an image, said image feature vector generation step partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a first configuration information prospect selection step of referring to query image feature vector configuration information which describes a configuration of an image feature vector of the query image and is a frequency distribution feature vector of an image, and outputting a configuration information list of possible feature vector configurations of the image feature vector of the query image;

a second configuration information prospect selection step of referring to images-to-be-retrieved feature vector configuration information describing the configuration of an image feature vector of the image to be retrieved, and outputting a configuration information list of possible feature vector configurations of the image feature vectors of the images to be retrieved;

a configuration information determination step of referring to the configuration information list obtained in said first configuration information prospect selection step and the configuration information list obtained in said second configuration information prospect selection step, and determining similarity computation image feature vector configuration information describing a configuration of an image feature vector for use in a similarity computation;

a first image feature vector conversion step of converting the image feature vector of the query image into a first image feature vector for use in the similarity computation according to the similarity computation image feature vector configuration information;

a second image feature vector conversion step of converting the image feature vectors of the images to be retrieved into a second image feature vector for use in the similarity computation according to the similarity computation image feature vector configuration information; and a step of computing similarity between the first image feature vector and the second image feature vector according to the similarity computation image feature vector configuration information.

47. The method of claim 46, wherein said color signals are a luminance (Y) and chrominance (Cb, Cr) signals.

48. An image retrieving method of retrieving an image similar to a predetermined query image from images to be retrieved by using an image feature vector when the configurations of the feature vector of a query image and the feature vector of an image to be compared are different from each other, comprising:

image feature vector generation step for generating a frequency distribution feature vector of an image, said image feature vector generation step partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a configuration information generation step of generating similarity computation image feature vector configuration information which describes a configuration of an image feature vector for use in a similarity computation and is a frequency distribution feature vector of an image;

a determination step of determining, according to similarity computation image feature vector configuration information generated in said configuration information generation step or configuration information reselection step, whether or not both of image feature vector of the query image and image feature vectors of the images to be retrieved can be converted;

said configuration information reselection step of selecting similarity computation image feature vector configuration information again when said determination step determines that the image feature vectors cannot be converted;

a first image feature vector conversion step of converting the image feature vector of the query image into a first image feature vector for use in a similarity computation according to the similarity computation image feature vector configuration information when said determination step determines that the image feature vectors can be converted;

a second image feature vector conversion step of converting the image feature vectors of the images to be retrieved into a second image feature vector for use in the similarity computation according to the similarity computation image feature vector configuration information when said determination step determines that the image feature vectors can be converted; and a step of computing similarity between the first image feature vector and the second image feature vector according to the similarity computation image feature vector configuration information.

49. The image retrieving method according to claim 44 or 48, wherein said configuration information generation step refers to query image feature vector configuration information describing a configuration of the image feature vector of the query image and images-to-be-retrieved feature vector configuration information describing a configuration of the image feature vectors of the images to be retrieved, and generates similarity computation image feature vector configuration information.

50. The method of claim 48, wherein said color signals are a luminance (Y) and chrominance (Cb, Cr) signals.

51. A computer-readable medium tangibly embodying an image retrieving program for directing a computer to perform an image retrieving process of retrieving an image similarity to a predetermined query image from images to be retrieved using an image feature vector when the configurations of the feature vector of a query image and the feature vector of an image to be compared are different from each other, comprising:

image feature vector generation process for generating a frequency distribution feature vector of an image, said image feature vector generation process partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a first image feature vector conversion process of receiving similarity computation image feature vector configuration information which describes a configuration of an image feature vector for use in a similarity computation and is a frequency distribution feature vector of an image, and converting the image feature vector of the query image into a first image feature vector according to the similarity computation image feature vector configuration information;

a second image feature vector conversion process of converting the image feature vector of the images to be retrieved into a second image feature vector according to the similarity computation image feature vector configuration information; and a process of computing similarity between the first image feature vector and the second image feature vector according to the similarity computation image feature vector configuration information.

52. The computer-readable medium according to claim 51, wherein when similarity between the first image feature vector and the second image feature vector is computed, normalized similarity can be computed depending on contents of the similarity computation image feature vector configuration information.

53. The computer-readable medium according to claim 51, wherein the image feature vector can be generated by obtaining a reduced image from an image of which a feature vector is to be extracted, and performing discrete cosine transform and quantization on the reduced image.

54. The computer-readable medium according to claim 51, wherein the similarity computation image feature vector configuration information relates to a configuration of discrete cosine transform coefficients forming an image feature vector.

55. The computer-readable medium according to claim 51, wherein the image feature vector is one or more dominant colors of an image, and the similarity computation image feature vector configuration information relates to the dominant color(s).

56. The computer-readable medium according to claim 51, wherein the image feature vector indicates a direction of an edge of an image, and the similarity computation image feature vector configuration information relates to a type of the direction of the edge.

57. The computer-readable medium according to claim 51, wherein the image feature vector indicates a texture of an image, and the similarity computation image feature vector configuration information relates to a type of the texture.

58. The computer-readable medium according to claim 51, wherein the image feature vector indicates a shape of an image, and the similarity computation image feature vector configuration information relates to a type of the shape.

59. The computer-readable medium according to claim 51, wherein the image feature vector indicates a motion of an image, and the similarity computation image feature vector configuration information relates to a type of the motion.

60. The computer-readable medium according to claim 51, wherein the image feature vector is generated by extracting a feature vector of each rectangular area after dividing an image into rectangular areas, and the similarity computation image feature vector configuration information relates to the rectangular area.

61. The computer-readable medium according to claim 51, wherein said frequency distribution feature vector of the image is a coefficient generated by a discrete cosine transformer (DCT) on a reduced image of a fixed size.

62. The computer-readable medium according to claim 61, wherein said frequency distribution feature vector of the image is the smaller number of coefficients generated by the DCT.

63. The computer-readable medium according to claim 62, wherein a configuration of said feature vector of the image is to define an order of the smaller number.

64. The computer-readable medium of claim 51, wherein said color signals are a luminance (Y) and chrominance (Cb, Cr) signals.

65. A computer-readable medium tangibly embodying an image retrieving program for directing a computer to perform an image retrieving process of retrieving an image similar to a predetermined query image from images to be retrieved using an image feature vector when the configurations of the feature vector of a query image and the feature vector of an image to be compared are different from each other, comprising:

image feature vector generation process for generating a frequency distribution feature vector of an image, said image feature vector generation process partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a first configuration information prospect selection process of referring to query image feature vector configuration information describing a configuration of an image feature vector of the query image, and outputting a configuration information list of possible feature vector configurations of the image feature vector of the query image;

a second configuration information prospect selection process of referring to images-to-be-retrieved feature vector configuration information describing the configuration of an image feature vector of the image to be retrieved, and outputting a configuration information list of possible feature vector configurations of the image feature vectors of the images to be retrieved;

a configuration information discrimination process of receiving similarity computation image feature vector configuration information which describes a configuration of an image feature vector for use in a similarity computation and is a frequency distribution feature vector of an image, and determining whether or not the similarity computation image feature vector configuration information is contained in both configuration information list obtained in said first configuration information prospect selection process and a configuration information list obtained in said second configuration information prospect selection process;

a first image feature vector conversion process of converting the image feature vector of the query image into a first image feature vector for use in the similarity computation according to the similarity computation image feature vector configuration information when said configuration information discrimination process determines that the information is contained in both lists;

a second image feature vector conversion process of converting the image feature vectors of the images to be retrieved into a second image feature vector for use in the similarity computation according to the similarity computation image feature vector configuration information when said configuration information discrimination process determines that the information is contained in both lists; and a process of computing similarity between the first image feature vector and the second image feature vector according to the similarity computation image feature vector configuration information.

66. The computer-readable medium of claim 65, wherein said color signals are a luminance (Y) and chrominance (Cb, Cr) signals.

67. A computer-readable medium tangibly embodying an image retrieving program for directing a computer to perform an image retrieving process of retrieving an image similar to a predetermined query image from images to be retrieved using an image feature vector when the configurations of the feature vector of a query image and the feature vector of an image to be compared are different from each other, comprising:

image feature vector generation process for generating a frequency distribution feature vector of an image, said image feature vector generation process partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a determination process of determining, according to similarity computation image feature vector configuration information which describes a configuration of an image feature vector for use in a similarity computation and is a frequency distribution feature vector of an image given as input or similarity computation image feature vector configuration information which describes a configuration of an image feature vector for use in a similarity computation and is a frequency distribution feature vector of an image generated in a configuration information reselection process, whether or not both of image feature vector of the query image and image feature vectors of the images to be retrieved can be converted;

a configuration information reselection process of selecting similarity computation image feature vector configuration information again when said determination process determines that the image feature vectors cannot be converted;

a first image feature vector conversion process of converting the image feature vector of the query image into a first image feature vector for use in a similarity computation according to the similarity computation image feature vector configuration information when said determination process determining that the image feature vectors can be converted;

a second image feature vector conversion process of converting the image feature vectors of the images to be retrieved into a second image feature vector for use in the similarity computation according to the similarity computation image feature vector configuration information when said determination process determines that the image feature vectors can be converted; and a process of computing similarity between the first image feature vector and the second image feature vector according to the similarity computation image feature vector configuration information.

68. The computer-readable medium of claim 67, wherein said color signals are a luminance (Y) and chrominance (Cb, Cr) signals.

69. A computer-readable medium tangibly embodying an image retrieving program for directing a computer to perform an image retrieving process of retrieving an image similar to a predetermined query image from images to be retrieved using an image feature vector when the configurations of the feature vector of a query image and the feature vector of an image to be compared are different from each other, comprising:

image feature vector generation process for generating a frequency distribution feature vector of an image, said image feature vector generation process partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being convened to obtain said frequency distribution feature vector;

a configuration information generation process of generating similarity computation image feature vector configuration information which describes a configuration of an image feature vector for use in a similarity computation which describes a configuration of an image feature vector for use in a similarity computation and is a frequency distribution feature vector of an image;

a first image feature vector conversion process of converting the image feature vector of the query image into a first image feature vector for use in a similarity computation according to the similarity computation image feature vector configuration information;

a second image feature vector conversion process of converting the image feature vectors of the images to be retrieved into a second image feature vector for use in a similarity computation according to the similarity computation image feature vector configuration information; and a process of computing similarity between the first image feature vector and the second image feature vector according to the similarity computation image feature vector configuration information.

70. The computer-readable medium according to claim 69, wherein said configuration information generation process refers to query image feature vector configuration information describing a configuration of the image feature vector of the query image and images-to-be-retrieved feature vector configuration information describing a configuration of the image feature vectors of the images to be retrieved, and generates similarity computation image feature vector configuration information.

71. The computer-readable medium of claim 69, wherein said color signals are a luminance (Y) and chrominance (Cb, Cr) signals.

72. A computer-readable medium tangibly embodying an image retrieving program for directing a computer to perform an image retrieving process of retrieving an image similar to a predetermined query image from images to be retrieved using an image feature vector when the configurations of the feature vector of a query image and the feature vector of an image to be compared are different from each other, comprising:

image feature vector generation process for generating a frequency distribution feature vector of an image, said image feature vector generation process partitions an image into multiple blocks of a predetermined size, computes an avenge color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a first configuration information prospect selection process of referring to query image feature vector configuration information which describes a configuration of an image feature vector of the query image and is a frequency distribution feature vector of an image, and outputting a configuration information list of possible feature vector configurations of the image feature vector of the query image;

a second configuration information prospect selection process of referring to images-to-be-retrieved feature vector configuration information describing the configuration of an image feature vector of the image to be retrieved, and outputting a configuration information list of possible feature vector configurations of the image feature vectors of the images to be retrieved;

a configuration information determination process of referring to the configuration information list obtained in said first configuration information prospect selection process and the configuration information list obtained in said second configuration information prospect selection process, and determining similarity computation image feature vector configuration information describing a configuration of an image feature vector for use in a similarity computation;

a first image feature vector conversion process of converting the image feature vector of the query image into a first image feature vector for use in the similarity computation according to the similarity computation image feature vector configuration information;

a second image feature vector conversion process of converting the image feature vectors of the images to be retrieved into a second image feature vector for use in the similarity computation according to the similarity computation image feature vector configuration information; and a process of computing similarity between the first image feature vector and the second image feature vector according to the similarity computation image feature vector configuration information.

73. The computer-readable medium of claim 72, wherein said color signals are a luminance (Y) and chrominance (Cb, Cr) signals.

74. A computer-readable medium tangibly embodying an image retrieving program for directing a computer to perform an image retrieving process of retrieving an image similar to a predetermined query image from images to be retrieved using an image feature vector when the configurations of the feature vector of a query image and the feature vector of an image to be compared are different from each other, comprising:

image feature vector generation process for generating a frequency distribution feature vector of an image, said image feature vector generation process partitions an image into multiple blocks of a predetermined size, computes an average color for each of said multiple blocks, generates a reduced image of a fixed size on which a transform is performed to obtain a plurality of coefficients, and extracts low frequency coefficient sequences of color signals, the extracted coefficient sequences being converted to obtain said frequency distribution feature vector;

a configuration information generation process of generating similarity computation image feature vector configuration information which describes a configuration of an image feature vector for use in a similarity computation and is a frequency distribution feature vector of an image;

a determination process of determining, according to similarity computation image feature vector configuration information generated in said configuration information generation process or configuration information reselection process, whether or not both of image feature vector of the query image and image feature vectors of the images to be retrieved can be converted;

a configuration information reselection process of selecting similarity computation image feature vector configuration information again when said determination process determines that the image feature vectors cannot be converted;

a first image feature vector conversion process of converting the image feature vector of the query image into a first image feature vector for use in a similarity computation according to the similarity computation image feature vector configuration information when said determination process determines that the image feature vectors can be converted;

a second image feature vector conversion process of converting the image feature vectors of the images to be retrieved into a second image feature vector for use in the similarity computation according to the similarity computation image feature vector configuration information when said determination process determines that the image feature vectors can be converted; and a process of computing similarity between the first image feature vector and the second image feature vector according to the similarity computation image feature vector configuration information.

75. The computer-readable medium of claim 74, wherein said color signals are a luminance (Y) and chrominance (Cb, Cr) signals.

* * * * *